(12) United States Patent
Miyamoto et al.

(10) Patent No.: US 7,309,287 B2
(45) Date of Patent: Dec. 18, 2007

(54) GAME MACHINE HAVING DISPLAY SCREEN WITH TOUCH PANEL

(75) Inventors: Shigeru Miyamoto, Kyoto (JP); Hirohito Yoshimoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 239 days.

(21) Appl. No.: 11/005,301

(22) Filed: Dec. 7, 2004

(65) Prior Publication Data

US 2005/0202869 A1    Sep. 15, 2005

(30) Foreign Application Priority Data

Dec. 10, 2003    (JP)    ............................. 2003-411986

(51) Int. Cl.
*A63F 13/00*    (2006.01)

(52) U.S. Cl. ...................................... 463/37

(58) Field of Classification Search ............ 463/36–39, 463/47; 715/345; 273/148 R, 148 B
See application file for complete search history.

(56) References Cited

U.S. PATENT DOCUMENTS

| | | | | |
|---|---|---|---|---|
| 4,302,011 A | * | 11/1981 | Pepper, Jr. .................... | 463/37 |
| 4,353,552 A | * | 10/1982 | Pepper, Jr. .................... | 463/37 |
| 5,717,432 A | * | 2/1998 | Miwa et al. .................. | 345/173 |
| 5,777,605 A | * | 7/1998 | Yoshinobu et al. ......... | 345/173 |
| 6,135,884 A | * | 10/2000 | Hedrick et al. ............... | 463/20 |
| 6,229,529 B1 | * | 5/2001 | Yano et al. .................. | 345/175 |
| 6,509,845 B1 | * | 1/2003 | Tanaka ........................ | 341/22 |
| 6,594,023 B1 | * | 7/2003 | Omura et al. ................ | 356/620 |
| 6,840,859 B2 | * | 1/2005 | Cannon et al. ............... | 463/30 |
| 6,942,571 B1 | * | 9/2005 | McAllister et al. ........... | 463/20 |

FOREIGN PATENT DOCUMENTS

| | | |
|---|---|---|
| JP | 5-31256 | 2/1993 |
| JP | 6-285257 | 10/1994 |
| JP | 6-285259 | 10/1994 |
| JP | 7-182092 | 7/1995 |

\* cited by examiner

*Primary Examiner*—Robert E Pezzuto
(74) *Attorney, Agent, or Firm*—Nixon & Vanderhye P.C.

(57) ABSTRACT

A change in input is made to a graphic displayed on a second display screen (12a) covered with a touch panel, with a stylus (16) or the like. By doing so, a player character P1 on a first display screen (11a) moves according to the change in the input. This allows a wide range of players to enjoy a game in a game machine having two display screens.

16 Claims, 19 Drawing Sheets

FIG. 11

| | CHANGE IN INPUT | INPUT LOCATION | INPUT RANGE | EMOTIONAL PARAMETER |
|---|---|---|---|---|
| FIRST INPUT PATTERN | CONTINUOUS | AROUND HEAD | DISTRIBUTED IN LONG AND THIN MANNER | INCREASE "HAPPINESS" |
| SECOND INPUT PATTERN | INTERMITTENT | AROUND NOSE | DISTRIBUTED IN DOT-LIKE PATTERN | INCREASE "ANGER" |
| ---------- | ---------- | ---------- | ---------- | ---------- |

F I G. 1 6 A
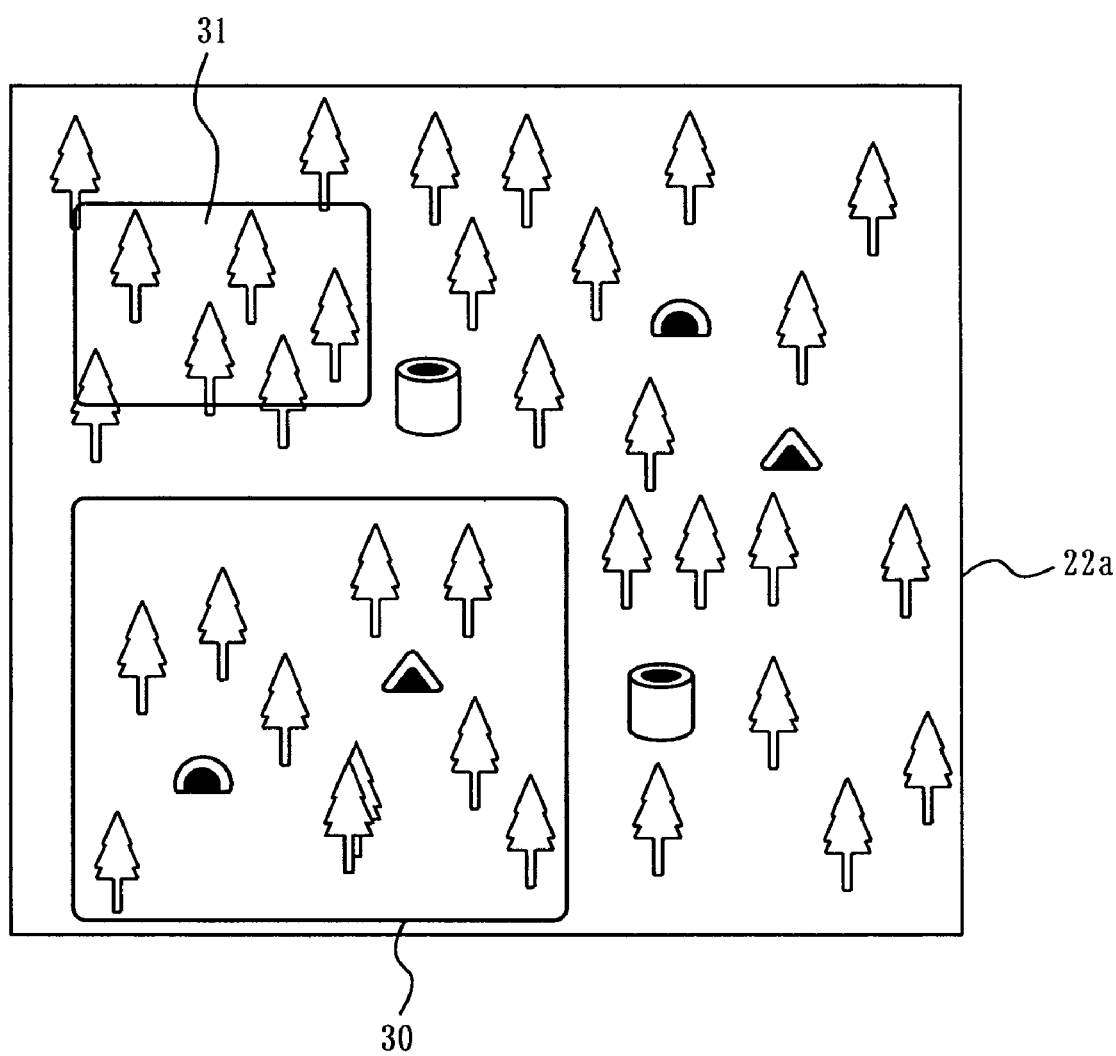

F I G. 1 6 B
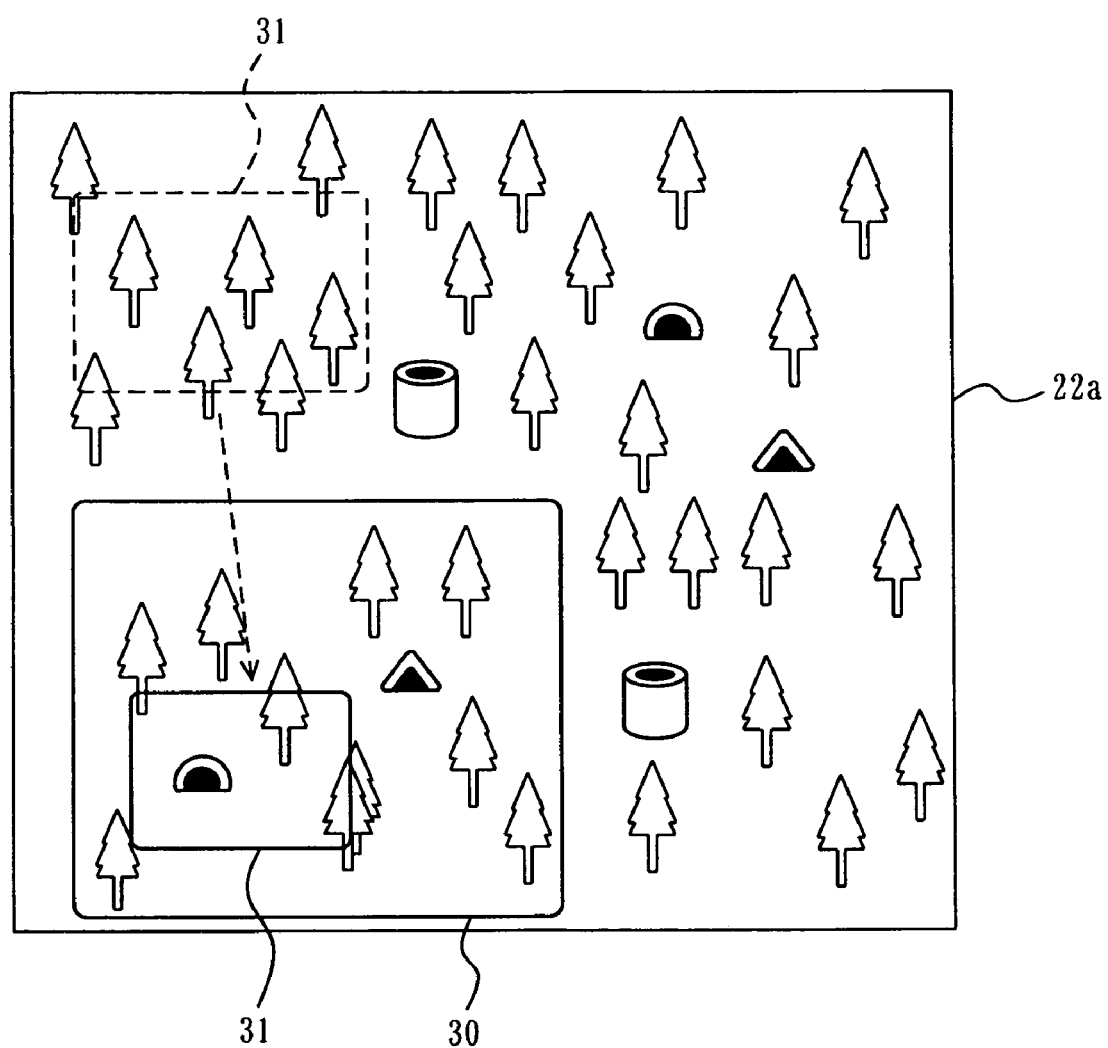

GAME MACHINE HAVING DISPLAY SCREEN WITH TOUCH PANEL

FIELD OF THE INVENTION

The present invention relates to a storage medium having stored therein a game program, and, more particularly, to a technique of changing, in a game machine having a first display screen and a second display screen covered with a touch panel, a game image according to the change in input to the second display screen.

BACKGROUND AND SUMMARY OF THE INVENTION

In a conventional game machine, a scene in a game space is displayed on a television or the like as a game image. The game machine has a controller with a plurality of control keys, connected thereto to allow a player to control a character appearing in the game space. The game machine changes the game image by detecting an output signal from the controller to identify which control key is controlled by the player, and then allowing an operation assigned to that control key to be reflected in the character.

However, since the shape and arrangement of the control keys on the controller are already physically determined, it is impossible to prepare the optimal control keys for a particular game. For this reason, as disclosed in Japanese Laid-Open Patent Publications No. 6-285257 and No. 6-285259, game machines are introduced which use a display device with a touch panel instead of a controller.

A game machine disclosed in Japanese Laid-Open Patent Publication No. 6-285257 displays on the touch panel images of necessary control keys of different types depending on the game program, as shown in FIG. 3 of the publication. Depending on which image of a control key is touched and selected, the function assigned to the selected image of the control key is reflected in the game.

In a game machine disclosed in Japanese Laid-Open Patent Publication No. 6-285259, as shown in FIGS. 3 to 8 of the publication, a graphic or letter related to a game image displayed on a television 16 is displayed on a display device with a touch panel on the controller side. By touching and selecting the graphic with the finger, the function assigned to the graphic, letter, or the like is reflected in the game.

However, conventional game machines such as those disclosed in the aforementioned Japanese Laid-Open Patent Publications No. 6-285257 and No. 6-285259 only determine whether a graphic or the like displayed on the display device beneath the touch panel on the controller side is selected, and then simply allow the function assigned to the graphic to be reflected in the game image. That is, since conventional physically arranged control keys are merely displayed on the display device beneath the touch panel, there is a problem that only a small effect is expected because the control keys can be simply displayed at any desired position or in any desired shape depending on the type of games.

A touch panel is also used in personal digital assistants (PDAs) and the like, and a system is employed in which a graphic displayed on a liquid crystal display device beneath the touch panel can be directly controlled. Specifically, in PDAs, by double-clicking a graphic of a folder, the folder opens, and by dragging a graphic of an icon, the icon is moved. Namely, in PDAs and the like, it is assumed that the user, whoever it may be, can certainly perform a desired operation, and therefore a directly touched graphic is caused to change in its display. However, if such a technique is simply applied to an electronic game, since the display of a directly touched graphic itself changes, a problem may arise in that the user may not be able to identify a graphic he/she should control. A specific example is provided below. In the case where graphics of a plurality of triangle-shaped control keys and a circle-shaped control key are displayed, if the circle-shaped button is selected and thereby its display is changed to a triangle shape, the player may be confused about which key is the original circle-shaped control key.

Therefore, a feature of the present illustrative embodiments is to provide a storage medium having stored therein a game program which allows a game image displayed on a first display screen to change according to the change in input to a graphic displayed on a second display screen covered with a touch panel.

Another feature of an illustrative embodiment is to provide a storage medium having stored therein a game program which allows game images displayed on a first display screen and a second display screen covered with a touch panel to selectively change according to the change in input to a graphic displayed on the second display screen.

Still another feature of an illustrative embodiment is to provide a storage medium having stored therein a game program which allows a game image to change more easily by extracting at least two calculation parameters from the change in input and then performing a calculation using the calculation parameters.

The exemplary illustrative embodiments have the following features to overcome the problems mentioned above. It is to be understood that reference numerals, supplemental remarks, etc. in parentheses illustrate the corresponding relationship with embodiments, which will be described below, and are provided to assist in the understanding of the exemplary illustrative embodiments, and thus are not intended to limit the scope of the present invention.

A first feature of the exemplary illustrative embodiments is directed to a storage medium having stored therein a game program to be executed by a computer (e.g., 21) of a game machine (1) having a first display screen (11a) and a second display screen (12a) covered with a touch panel (13), the game program causing the computer to function as game image display controller (S1), graphic display controller (S2), input change detector (S3, S7, S8), parameter extractor (S4, S6, S9), change condition calculator (S11), and image change controller (S12). The game image display controller displays a game image (P1, D, T) on the first display screen. The graphic display controller displays on the second display screen a graphic (P2; e.g., one of graphics contained in the game image) related to the game image. The input change detector detects a change in input (e.g., a change in a series of continuous inputs) to the touch panel. If the input detected by the input change detector is provided to the graphic, the parameter extractor extracts at least two types of calculation parameters (such as a start point, an end point, part or all of the points between the start point and the end point, and a detection input time) from the change in the input. The change condition calculator calculates, based on the calculation parameters, change condition setting data used to change the game image according to the change in the input. The image change controller changes the game image on the first display screen based on the change condition setting data.

In a second feature of the exemplary illustrative embodiments, the computer is caused to function as the game image display controller, the graphic display controller, the change condition calculator, and the image change controller as follows. The game image display controller may display on the first display screen a game image containing a player character (e.g. a display of the player character changing in response to the input from a player). The graphic display controller may display a character pattern (P2) associated with the player character. The change condition calculator may calculate change condition setting data used to change the display of the player character according to a change in the input to the character pattern. The image change controller may change the display of the player character in the game image based on the change condition setting data.

In a third feature of the exemplary illustrative embodiments, the computer is caused to function as the input change detectors, the parameter extractor, the change condition calculator, and the image change controller as follows. Specifically, the input change detector may detect a change in the input by determining at predetermined time intervals whether input is provided to the touch panel, and then detecting sets of position coordinates on the touch panel obtained while the input is continuously detected. The parameter extractor may extract, as calculation parameters, sets of position coordinates including an input start point and an input end point, with respect to the touch panel. The change condition calculator may calculate, based on the calculation parameters, change condition setting data (e.g., a movement direction, an initial speed, an acceleration, a deceleration, a movement distance, a movement speed, a spin direction, etc.) used to move the player character according to a positional relationship between the input start point and the input end point. The image change controller may move the player character based on the change condition setting data.

In a fourth feature of the exemplary illustrative embodiments, the computer is caused to function as the input change detector, the parameter extractor, the change condition calculator, and the image change controller, as follows. The input change detector may detect a change in the input by determining at predetermined time intervals whether input is provided to the touch panel, and then detecting sets of position coordinates on the touch panel obtained while the input is continuously detected. The parameter extractor may extract, as calculation parameters, sets of position coordinates including an input start point and an input end point, with respect to the touch panel. The change condition calculator may calculate, based on the calculation parameters, change condition setting data used to move the player character according to a positional relationship between the input start point or the input end point and a reference position of the character pattern. The image change controller may move the player character based on the change condition setting data.

In a fifth feature of the exemplary illustrative embodiments, the computer may be further caused to function as a timekeeper for measuring an input detection time while the input to the touch panel is continuously detected, and the parameter extractor may extract at least two types of calculation parameters including the measured input detection time. The change condition calculator may calculate, based on the calculation parameters, change condition setting data used to reflect the input time in movement of a player character.

A sixth feature of the exemplary illustrative embodiments is directed to a storage medium having stored therein a game program to be executed by a computer (e.g., 21) of a game machine (1) having a first display screen (11a) and a second display screen (12a) covered with a touch panel (13), the game program causing the computer to function as game image display controller (S21), graphic display controller (S22), input change detector (S25, S27, S28), input pattern extractor (S26, S29), emotional parameter changer (S30), and image change controller (S31). The game image display controller displays on the first display screen a game image containing a player character (P6) (e.g. a display of the player character (P6) changing in response to input from a player). The graphic display controller displays on the second display screen a character pattern (P61) associated with the player character (P6). The input change detector detects a change in the input by detecting, at predetermined time intervals, the input provided to the touch panel and then detecting sets of position coordinates on the touch panel obtained while the change in the input is detected. The input pattern extractor extracts, if the input detected by the input change detector is provided to the character pattern, an input pattern closest to the change in the input from a group of input patterns prepared in advance. The emotional parameter changer changes emotional parameters assigned to the player character, according to a type of the input pattern and the number of times the input pattern has been repeated, which are extracted by the input pattern extractor, the emotional parameters being stored. The image change controller changes a display of the player character based on the emotional parameters having been changed by the emotional parameter changer.

A seventh feature of the exemplary illustrative embodiment is directed to a storage medium having stored therein a game program to be executed by a computer (e.g., 21) of a game machine (1) having a first display screen (11a) and a second display screen (12a) covered with a touch panel (13), the game program causing the computer to function as: narrow-area map display controller (S43), wide-area map display controller (S42), input pattern detector (S44, S45), and narrow-area map updater (S46, S47, S48). The narrow-area map display controller sets, within an image storage region (22a) where a game space is rendered, a first display range (31) used to display part of the rendered game space, and displays, as a narrow-area map, an image contained in the first display range on the first display screen at an enlarged scale. The wide-area map display controller sets, within the image storage region, a second display range (30) wider than the first display range, and displays an image contained in the second display range on the second display screen, as a wide-area map. The input pattern detector detects an input pattern provided to a region of the touch panel where the wide-area map is displayed, and an input position of the input pattern. The narrow-area map updater updates, if the input pattern detected by the input pattern detector is determined as a first input pattern, a display of the narrow-area map by moving the first display range to a location within the image storage region which corresponds to the input position, and then displaying an image contained in the first display range on the first display screen at an enlarged scale.

In an eighth feature of the exemplary illustrative embodiment, the computer may be further caused to function as a wide-area map updater (S46, S49, S50). The wide-area map updater updates, if the input pattern detected by the input detector is determined as a second input pattern, the wide-area map by scrolling the second display range within the image storage region in conjunction with the input pattern, and then displaying an image contained in the second display range on the second display screen.

According to the first feature, since a graphic related to a game image is displayed on the second display screen covered with a touch panel and the game image is caused to change according to the change in input provided to the graphic by a player, the game image on the first display screen which is different from the screen on which the graphic is displayed can be changed in response to the input provided to the graphic. Accordingly, for example, it is possible to change the course of the game according to the change in the input provided to the graphic by the player. Further, since the game image is changed by performing a calculation based on at least two calculation parameters extracted from the change in the input, the game image can be changed by a simpler process. Therefore, it is possible to provide a game which enables a new form of expression which cannot be realized by a simple control-key selection as in conventional cases.

According to the second feature, since a character pattern associated with a player character is displayed on the second display screen, the player can be easily aware that the player character on the first display screen is the object to be controlled by him/her. In addition, since the display of the player character on the first display screen changes according to the change in the input to the character pattern on the second display screen, it is possible to provide a game which gives the player an unprecedented sense of control.

According to the third feature, since how the player character is moved is determined by the relationship between the coordinate positions of the input start point and the input end point, the player's intuitive control can be reflected in the movement of the player character on the first display screen.

According to the fourth feature, since how the player character is moved is determined by the relationship between the coordinate positions of the input start point or the input end point, and a reference position of the character pattern, the player's intuitive control can be reflected in the movement of the player character on the first display screen.

According to the fifth feature, since the time during which the input is continuously provided is reflected in how the player character is moved, the player's intuitive control can be reflected in the movement of the player character on the first display screen.

According to the sixth feature, since emotional information of the player character is changed according to the change in the input and the display of the player character is changed based on the emotional information, the display of the player character can be changed depending on what input the player provides. Accordingly, it is possible to provide a game giving the player a sense of flexible control, which cannot be realized by a simple control-key selection as in conventional cases.

According to the seventh feature, since a narrow-area map is displayed on the first display screen, a wide-area map is displayed on the second display screen, and part of the wide-area map is displayed, as a narrow-area map, on the first display screen at an enlarged scale according to a first input pattern provided to the wide-area map, it is possible to provide a complex game which allows two screens to be simultaneously displayed.

According to the eighth feature, since a narrow-area map is displayed on the first display screen, a wide-area map is displayed on the second display screen, and either the narrow-area map or the wide-area map is changed according to an input pattern provided to the wide-area map, it is possible to provide a complex game that allows two screens to be simultaneously displayed and proceeds while the player character can be controlled using the two screens, appropriately.

BRIEF DESCRIPTION OF THE DRAWINGS

These and other features and advantages will be better and more completely understood by reference to the following detailed description of exemplary illustrative embodiments in conjunction with the drawings of which:

FIG. 11 is an illustrative diagram showing ready-made input patterns in the second embodiment;

FIG. 16A is an illustrative diagram showing a first change in a map in the entire map in the third embodiment;

FIG. 16B is an illustrative diagram showing the first change in the map in the entire map in the third embodiment;

DETAILED DESCRIPTION

A portable game machine 1 having installed thereon a computer which executes a game program according to an embodiment of the present invention will be described below. Although the embodiments of the present invention describe the case where the display of a player character contained in a game image is caused to change, the display of the entire game image may be caused to change. The description is provided for an example case where a portable game machine having two physical display screens, one of which is covered with a touch panel, is used as a game machine according to the present invention. As the game machine, for example, a stationary video game machine, an arcade game machine, a portable terminal, a mobile phone, a personal computer, or the like may also be used. The game machine of the present invention may be such a game machine that one physical display screen is divided into two screens using software and at least one of the display screens is covered with a touch panel.

Figure 1:
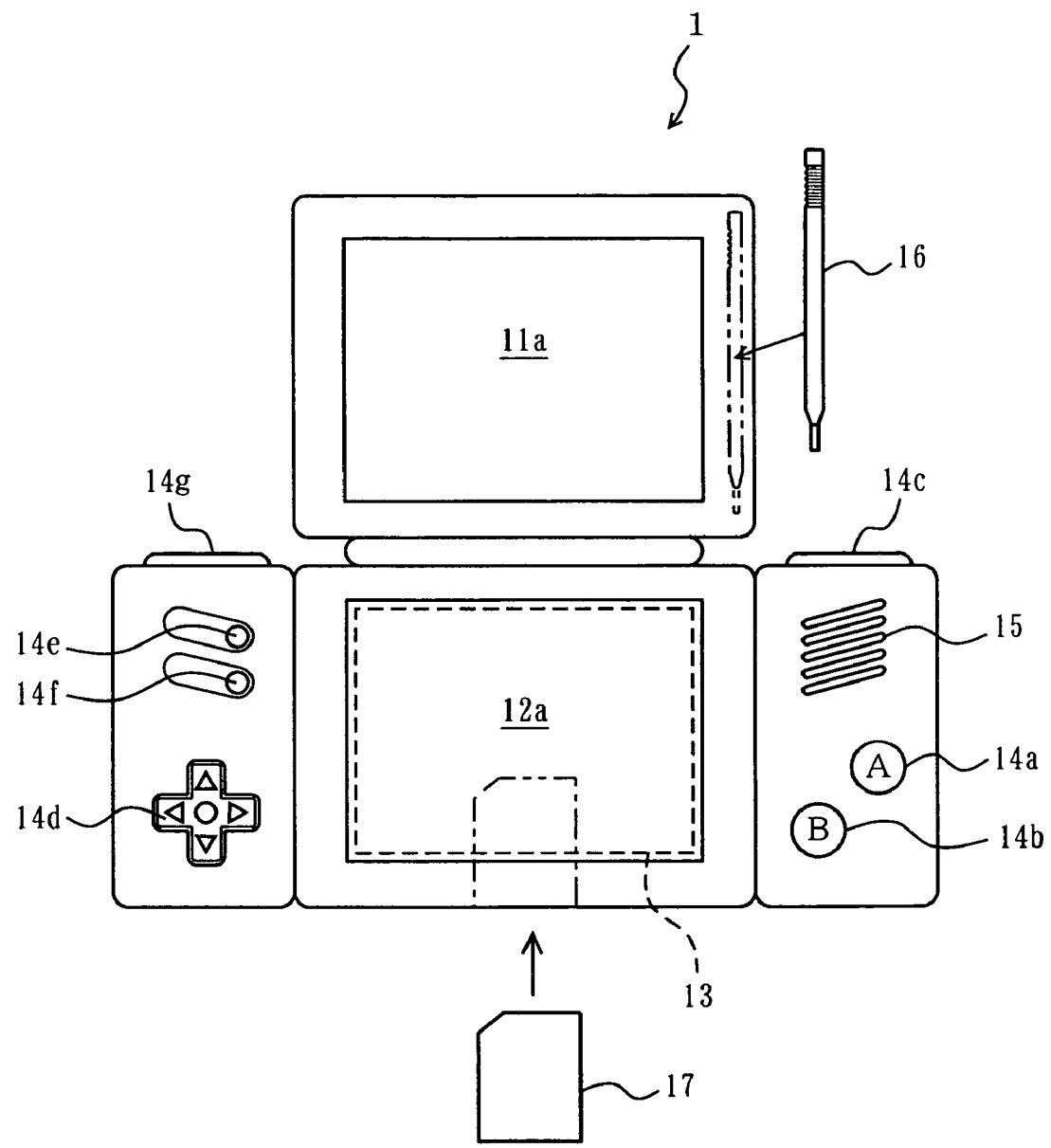
FIG. 1 is an external view illustrating an exemplary illustrative game machine.

FIG. 1 is an external view illustrating a portable game machine 1. As shown in FIG. 1, the portable game machine 1 (hereinafter simply referred to as the "game machine 1") has two display screens, a first display screen 11a and a second display screen 12a. A surface of the second display screen 12a is covered with a touch panel 13. On the right side of the second display screen 12a there are provided an A button 14a, a B button 14b, and an R switch 14c which can be operated by the right hand of a player and a speaker 15 for outputting game music. On the left side of the second display screen 12a there are provided a cross key 14d, a start button 14e, a select button 14f, and an L switch 14g which can be operated by the left hand of the player. In addition, the game machine 1 includes a stylus 16 used to provide input to the touch panel 13. The stylus 16 is removably mounted on the game machine 1. Further, a memory card 17 which is a storage medium having stored therein a game program of the present invention can be freely inserted into and ejected from the game machine 1. Note that if the touch panel 13 has a high position detection accuracy, the use of the stylus 16 is effective; however, if the position detection accuracy is low, it is not necessary to use the stylus 16, and input may be provided by the finger of the player, for example. The touch panel 13 may be of any type, such as, for example, a resistance film type, an optical type, an ultrasonic type, a capacitance type, or an electromagnetic induction type; however, the resistance film type is particularly favorable in terms of cost. For a detection method, a matrix method (digital) or a resistance value detection method (analog) can be used depending on the configuration.

Figure 2:
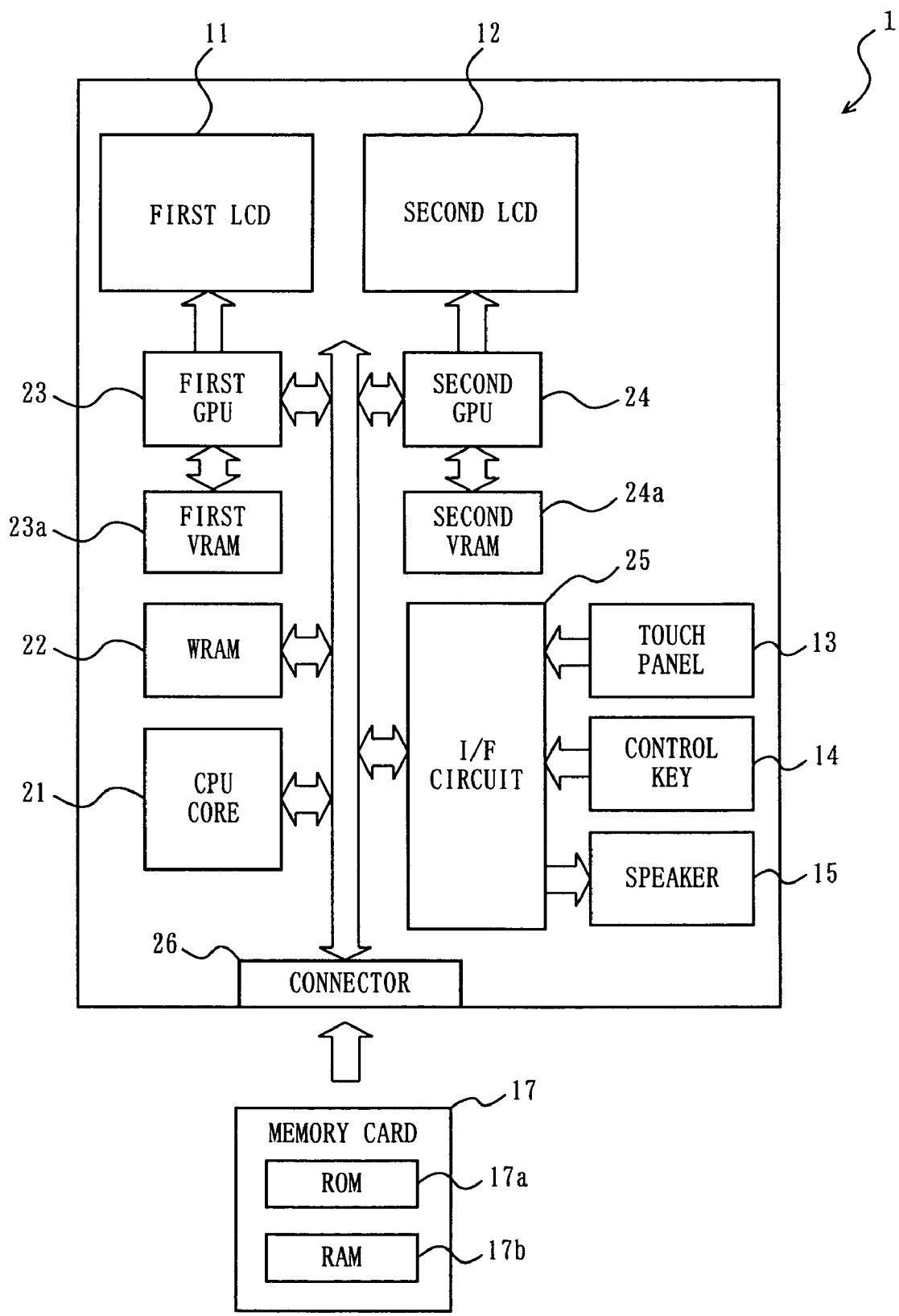
FIG. 2 is a functional block diagram of the game machine.

FIG. 2 is a block diagram of the game machine 1. As shown in FIG. 2, the game machine 1 includes a CPU 21 which is an exemplary computer for executing a game program, and the like. A WRAM (work random access memory) 22, a first GPU (Graphics Processing Unit) 23, a second GPU 24, and an I/F (interface) circuit 25 are electrically connected to the CPU (Central Processing Unit) 21 via a bus. The WRAM 22 is a memory for temporarily storing a game program to be executed by the CPU 21, calculation results obtained by the CPU 21, and the like. The first GPU 23 renders in a first VRAM 23a a game image to be outputted, for display, to a first LCD (liquid crystal display) 11 in response to an instruction from the CPU 21, and then allows the first display screen 11a of the first LCD 11 to display the rendered game image. The second GPU renders in a second VRAM 24a a game image or a graphic to be outputted, for display, to a second LCD 12 in response to an instruction from the CPU 21, and then allows the second display screen 12a to display the rendered game image. The I/F circuit 25 passes data between the CPU 21 and external input/output devices such as a touch panel 13, a control key 14, and a speaker 15. The touch panel 13 (including a device driver for the touch panel) has a coordinate system corresponding to the coordinate system of the second VRAM 24, and outputs data of a set of position coordinates corresponding to a position inputted (indicated) by the stylus 16. Note that although the embodiments of the present invention are described for the case where the resolution of the display screen is 192 dots×256 dots and the detection accuracy of the touch panel 13 is also 192 dots× 256 dots corresponding to the resolution of the display screen, the detection accuracy of the touch panel 13 may be lower than the resolution of the display screen.

Further, a connector 26 is electrically connected to the CPU 21, and a memory card 17 can be inserted into the connector 26. The memory card 17 is a storage medium for storing a game program; specifically, the memory card 17 contains a ROM 17a for storing a game program and a RAM 17b for rewritably storing backup data. A game program stored in the ROM 17a of the memory card 17 is loaded into the WRAM 22. The game program loaded into the WRAM 22 is executed by the CPU 21.

FIRST EMBODIMENT

Figure 3:
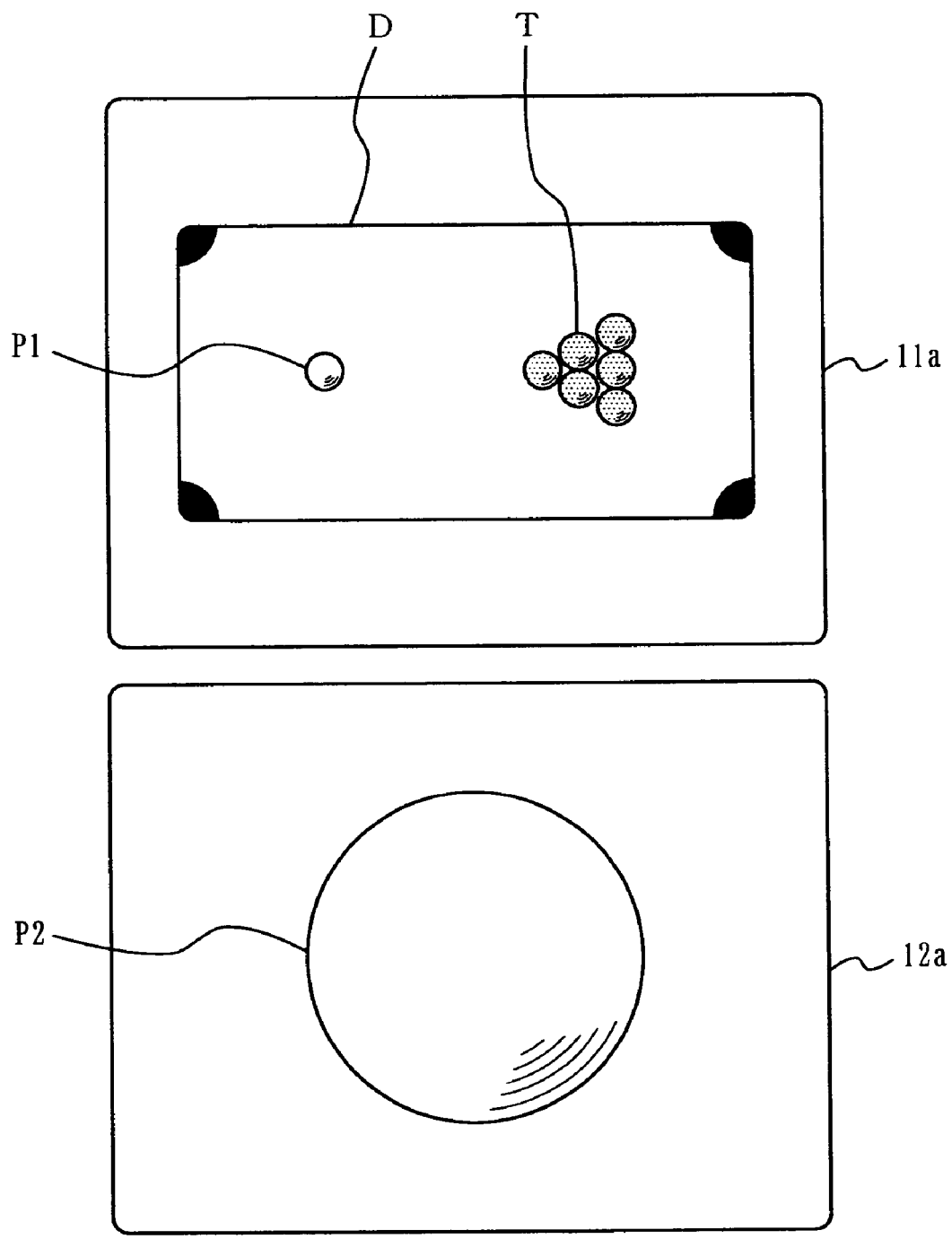
FIG. 3 is a diagram illustrating exemplary screens showing game images of a first embodiment of the present invention.
Figure 4:
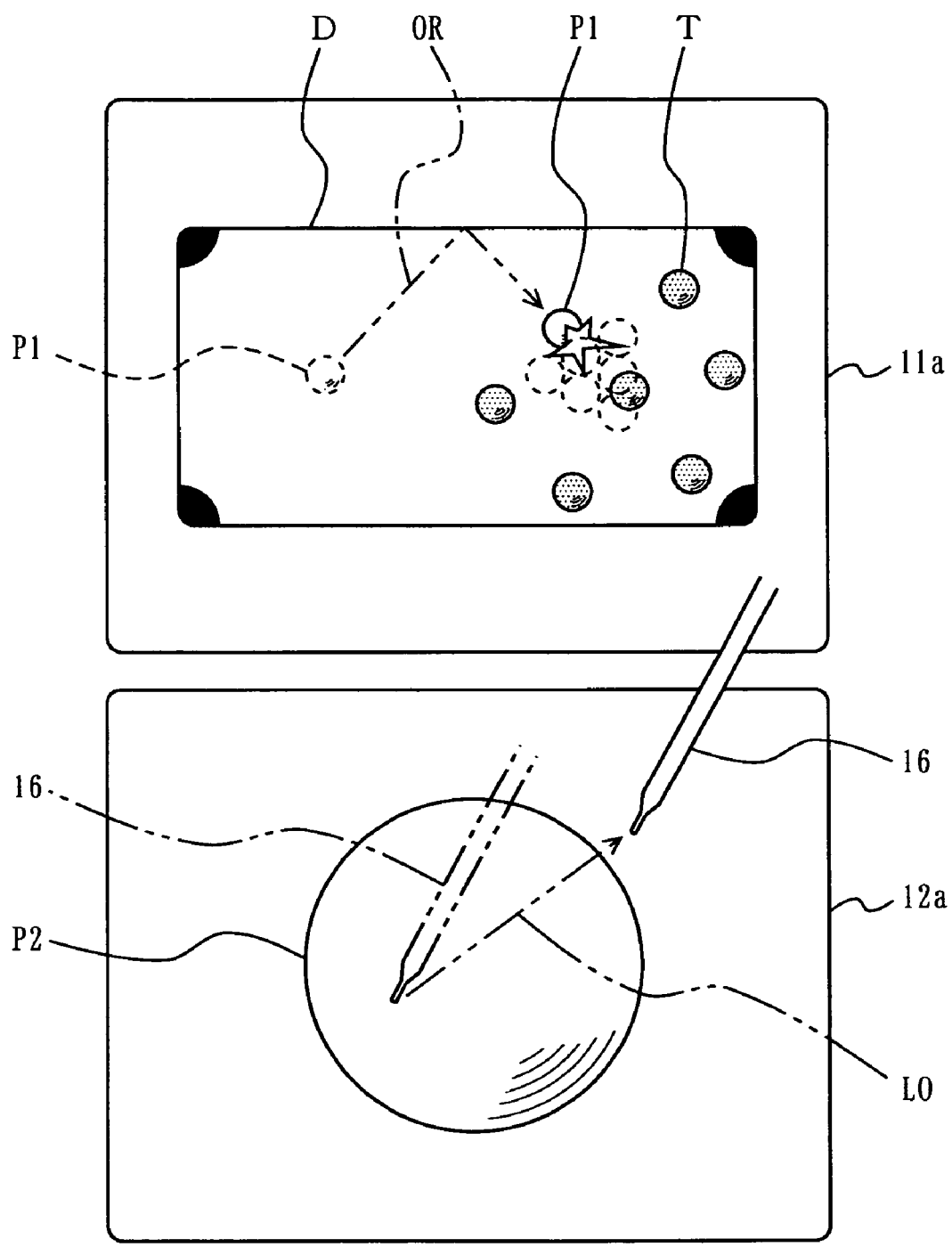
FIG. 4 is a diagram illustrating an exemplary screen showing a change in the game image according to the change in input to a touch panel in the first embodiment.

The game to be executed based on a game program according to a first exemplary illustrative embodiment will be described below. The first exemplary illustrative embodiment describes the case where a player character P1 displayed on the first display screen 11a is caused to move according to the change in input to a character pattern P2 on the second display screen 12a. Before describing the detailed flow of the game program, to facilitate the understanding of the present invention, an overview of the present invention will be provided with reference to FIGS. 3 and 4. FIG. 3 is a diagram illustrating exemplary screens showing game images displayed on the first display screen 11a and the second display screen 12a by the game program of an exemplary illustrative embodiment. FIG. 4 is a diagram illustrating an exemplary screen showing a change in the game image on the first display screen, caused when a change in input is made to the second display screen 12a.

First, as shown in FIG. 3, a game image is displayed on the first display screen 11a of the game machine 1, and an image of a graphic related to the game image is displayed on the second display screen 12a. The game image shows a scene in a game space, as viewed from a predetermined viewpoint. The graphic is an image of a graphic, such as a character or an item appearing in the game, which is different depending on the type of games. The graphic is associated with an image contained in the game image by the program so as to operate in conjunction with the image.

Specifically, the game program allows the game machine to display a billiards game on two screens. On the first display screen 11a, a game image is displayed which shows a billiards table D on which there are a cue ball P1 and six object balls Ts, as viewed from the upper viewpoint. The cue ball P1 is an image representing a player character controllable by the player, and the object balls Ts are images which are caused to move on the billiard table D by collisions with the cue ball P1, or the like. On the second display screen 12a, as a character pattern of the present invention, an image of a controlling cue ball P2, which is an image as viewed from directly above the cue ball P1, is displayed. The cue ball P1 is associated with the controlling cue ball P2 by the program. Thus, a change in input to the controlling cue ball P2 is reflected in the change in the display of the cue ball P1 ("movement" in the present exemplary illustrative embodiment), which is an exemplary change in the game image. Since the second display screen 12a is covered with the touch panel 13, by detecting input to a region of the touch panel 13 corresponding to the display region of the controlling cue ball P2 displayed on the second display screen 12a, a change in the input to the controlling cue ball P2 can be detected. The game image at this stage is shown in FIG. 4.

As shown in FIG. 4, the player provides input to the touch panel 13 of the second display screen 12a using the stylus 16. In other words, an instruction to input to the graphic P2 displayed on the second display screen 12a is provided. In the game machine 1, by detecting a change in the input, a continuous input in a first direction LO, for example, is recognized. When a continuous input in the first direction LO is detected, for example, an initial shot direction and an initial speed of the cue ball P1 on the first display screen 11a are calculated based on at least two parameters included in the change in the input. The initial shot direction and the initial speed correspond to change condition setting data in the present invention. The cue ball P1 moves while the movement of the cue ball P1 is calculated based on the initial shot direction and the initial speed, whereby a game image in which the cue ball P1 moves along a track line OR on the billiards table D is generated, and the game image is displayed on the first display screen 11a. In this manner, the game image on the first display screen 11a is caused to change based on the change in the input to the second display screen 12a. Note that although the exemplary screen of the present exemplary illustrative embodiment shows an example case where a drag is performed in the first linear direction LO, a drag may be performed in a curve or an S-shaped curve. In such a case, by additionally using a set of position coordinates of some point between the start point and the end point, as a calculation parameter, it is possible to control the cue ball P1 to move along an S-shaped track line, for example. In this case, of course, the cue ball P1 is caused to move while the spin direction, spin rate, etc., of the ball are calculated.

Figure 5:
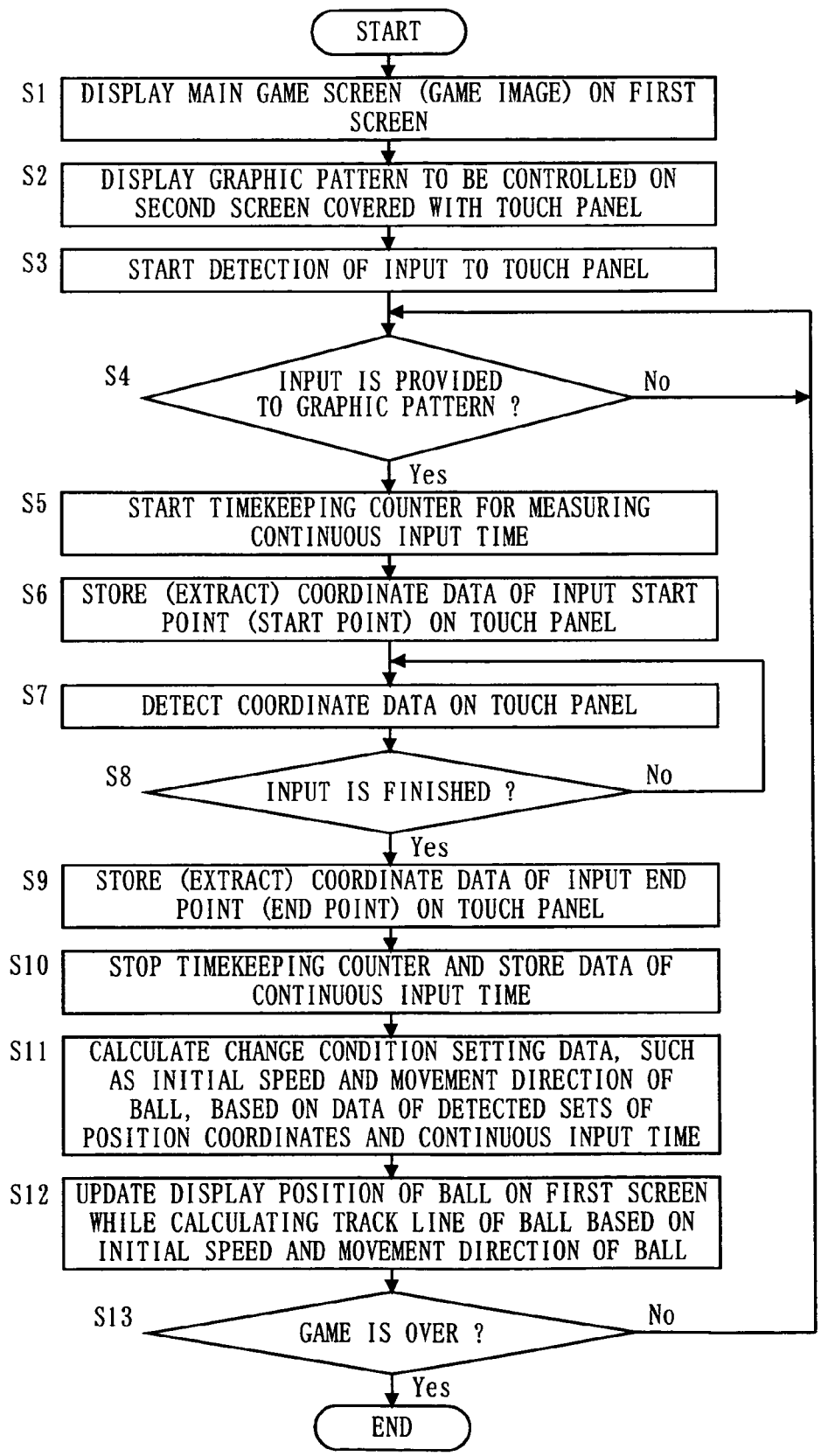
FIG. 5 is a main flowchart showing game processing performed by a game machine in the first embodiment.
Figure 6A:
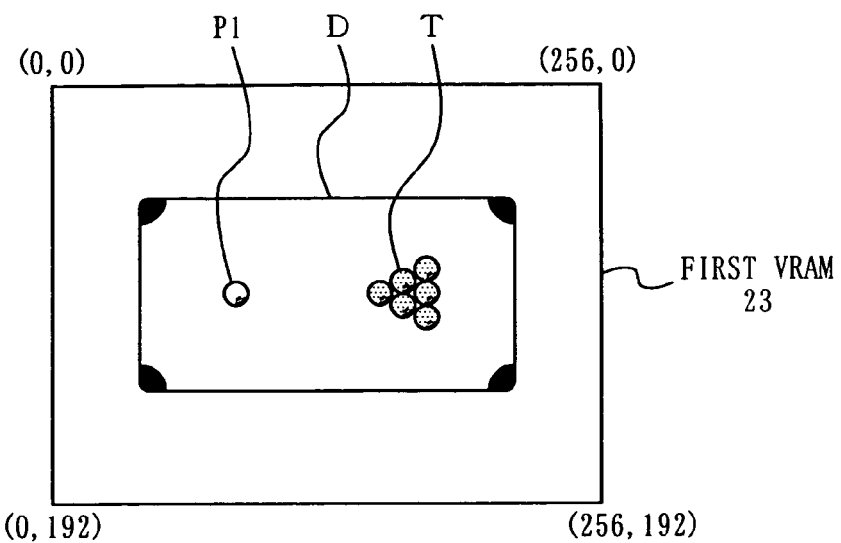
FIG. 6A is a conceptual diagram showing a game image rendered in a first VRAM 23 in the first embodiment.
Figure 6B:
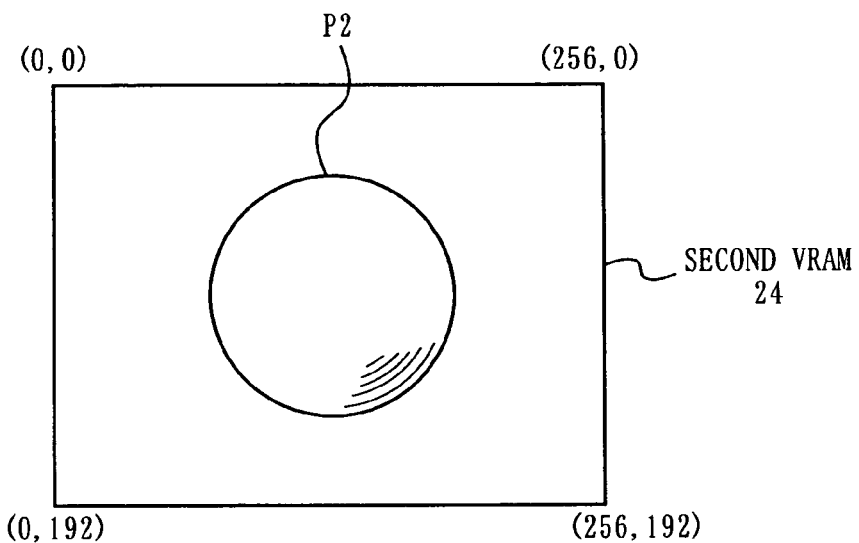
FIG. 6B is a conceptual diagram showing a game image rendered in a second VRAM 24 in the first embodiment.
Figure 6C:
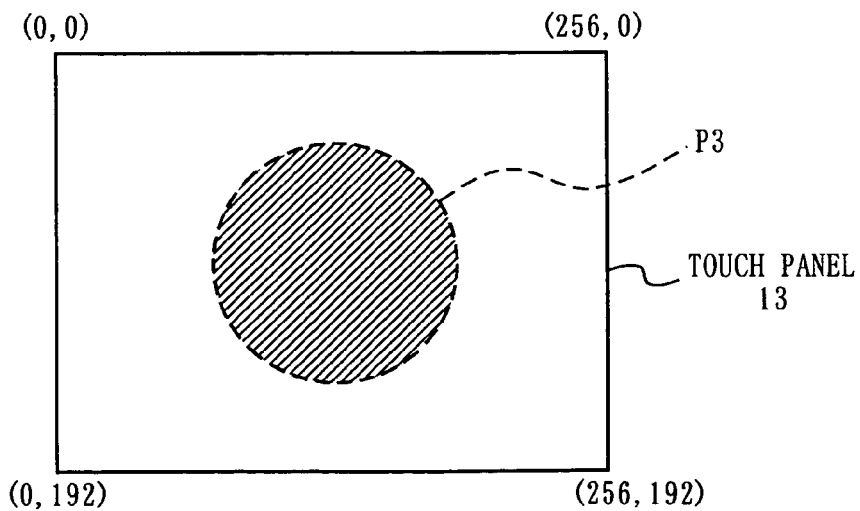
FIG. 6C is a conceptual diagram showing a touch panel 13 in the first embodiment.

Now, the processing performed by the game program will be described in detail with reference to the flow in FIG. 5 and the diagrams in FIGS. 6A, 6B, and 6C showing the concepts of the first VRAM, the second VRAM, and the touch panel. First, when the power (not shown) of the game machine 1 is turned on, the CPU 21 executes a boot program (not shown), whereby a game program stored in the memory card 17 is loaded into the WRAM 22. By the CPU 21 executing the loaded game program, the following steps are performed.

First, in step 1, in response to an instruction from the CPU 21, the first GPU 23 goes into operation, and various image data, such as a billiards table, contained in the game program is read, and then a game image is rendered in the first VRAM 23a. Specifically, as shown in FIG. 6A, a billiards table D, a cue ball P1, and a plurality of object balls Ts are rendered in a rendering region of a first VRAM 23. Then, an image in the first VRAM 23 is outputted, for display, to the first LCD 11. In subsequent step 2, in response to an instruction from the CPU 21, the second GPU 24 goes into operation, and image data of a character pattern contained in the game program is read, and then the graphic related to the game image is rendered in the second VRAM 24. Specifically, as shown in FIG. 6B, a character pattern P2 which is the graphic to be controlled is rendered in a rendering region of a second VRAM 24. Then, data in the second VRAM 24 is outputted, for display, to the second LCD 12. Through these steps 1 and 2, the play of the billiard game is ready to start.

In step 3, the detection of input to the touch panel 13 starts. The touch panel 13 has, as shown in FIG. 6C, a coordinate system corresponding to the coordinate system of the second VRAM 24, and outputs data of a set of position coordinates corresponding to a position inputted (indicated) by the stylus 16. That is, in this step, a set of position coordinates outputted from the touch panel 13 (including a device driver for controlling the touch panel 13) is detected.

In the subsequent step 4, it is determined whether input is provided to the character pattern P2. Specifically, it is determined whether a set of position coordinates first detected from the touch panel 13 (i.e., a set of position coordinates which serves as the start point for the change in input) is included in a coordinate region P3 (see FIG. 6C) where the character pattern P2 (see FIG. 6B) is rendered. If the set of position coordinates is included in the coordinate region, it is determined that input is provided to the character pattern P2 and thus step 5 is performed. If the set of position coordinates is not included in the coordinate region, step 3 is repeated.

If input is provided to the character pattern P2, in order to detect a change in the input, the following steps, 5 to 8, are performed. In step 5, measurement of the time during which a continuous input is provided starts. In the subsequent step 6, data of a set of position coordinates at the point when the input has started (step 4) is temporarily stored in the WRAM 22. The data of the set of position coordinates stored in step 6 is one of the calculation parameters (i.e., a parameter of a set of position coordinates of the start point).

In the subsequent step 7, the output from the touch panel 13 is detected at predetermined time intervals. In step 8, until the output from the touch panel 13 is finished, step 7 is repeated. That is, in steps 7 and 8, while a continuous input is provided to the touch panel 13, the change in the input is continuously detected. Note that in the present exemplary illustrative embodiment, if the output from the touch panel 13 is cut off even once, the continuous input is then determined to be finished; however, the continuous input may be determined to be finished when, for example, the output from the touch panel 13 cannot be detected in several successive detections.

If the output from the touch panel 13 is finished (i.e., if the input to the touch panel 13 from the player is finished), in step 9, data of a set of position coordinates at the point when the input has finished is stored in the WRAM 22. The set of position coordinates at the end point stored in step 9 is one of the calculation parameters. In the subsequent step 10, the counter for timekeeping is stopped at the point when the continuous input is finished, and data of a continuous input time which indicates how long the continuous input lasted is stored in the WRAM 22. The data of the continuous input time is also one of the calculation parameters.

In the aforementioned steps 6 and 9, at least two calculation parameters are extracted from the change in the input. The present exemplary illustrative embodiment further describes the case where three parameters are used which additionally include data of a continuous input time. As will become clear from the following description, although in the present exemplary illustrative embodiment two sets of position coordinates of the start point and the end point are extracted as calculation parameters, it is also possible to use, for example, data of sets of position coordinates of part or all of the points between the start point and the end point. In addition, in the present exemplary illustrative embodiment, although the time from the start point to the end point is used as a continuous input time, it is also possible to use, as a parameter, the time from the start point to some point before the end point. By using the time at some point before the end point so that the behavior of the cue ball P1 changes according to the change in the input in the first half from the start point to the end point, more intuitive movement of the cue ball P1 according to the control of the player can be displayed. The type and number of these necessary parameters are determined by the operations the player wants a player object (the cue ball P1 in the present exemplary illustrative embodiment) on the first display screen 11a to perform. That is, in the case of allowing the player object to perform complex operations, the number of calculation parameters required to determine the complex operations increases; however, in the case of allowing the player object to perform simple operations such as linear movement, calculation can be done using only two parameters.

In step 11, change condition setting data, such as the initial speed and movement direction of the cue ball P1 in the game image on the first display screen 11a is calculated based on the calculation parameters. Specifically, by the aforementioned steps, the initial speed and movement direction of the cue ball P1 are calculated based on three calculation parameters which include the data of the set of position coordinates of the input start point (i.e., the start point), the data of the set of position coordinates of the input end point (i.e., the end point), and the data of the continuous input time from the start point to the end point. For example, if the start point is (x1, y1), the end point is (x2, y2), and the continuous input time is t1, the movement direction ($\Delta x$, $\Delta y$) is calculated by finding the difference (x1−x2=$\Delta x$, y1−y2=$\Delta y$) between the start point (x1, y1) and the end point (x2, y2). Namely, if the location where the cue ball P1 is arranged is at a set of position coordinates (X, Y), the cue ball P1 is caused to move in the direction of ($\Delta x$, $\Delta y$) (i.e., the first direction LO) from the set of position coordinates (X, Y). Then, the initial speed of the cue ball P1 is calculated such that the shorter the continuous input time, the faster the initial speed. For example, the initial speed is calculated such that initial speed=presetting initial speed÷continuous input time t1. Alternatively, upon calculation of the initial speed, the difference ($\Delta x$, $\Delta y$) may be taken into account, and the calculation may be performed such that the greater the difference, the faster the initial speed, or vice versa.

In the case of using two parameters including the continuous input time t1 and either the start point (x1, y1) or the end point (x2, y2), if the reference position of the character pattern P2 is (x0, y0), the difference between the reference position (x0, y0) and either the start point or the end point is calculated and the direction of the calculated difference is used as the movement direction, and the initial speed is determined by the continuous input time t1. Further, the initial speed and the movement direction can be calculated with the use of only the start point and the end point. For example, the difference between the start point and the end point is taken and the difference is used as the movement direction, and the magnitude of the difference is reflected in the initial speed. In this manner, by extracting at least two calculation parameters from the change in input, the game image on the first display screen 11a can be changed according to the change in the input. Note that in this game only those conditions that are required to move the cue ball P1 need to be calculated, and thus other conditions than the initial speed and the movement direction, such as an acceleration rate, a deceleration rate, a movement distance, and a movement speed, for example, may be calculated.

In step 12, conditions required to move the cue ball P1 are set based on the change condition setting data, such as the initial speed and the movement direction which are the calculation results obtained using the aforementioned parameters. Then, while calculations of deceleration caused by friction with the billiards table, collision with and reflection at the wall and the like are performed based on the aforementioned conditions, a scene in which the cue ball P1 is spinning and moving along the track line OR is displayed on the first display screen 11a. In the subsequent step 13, until the game is over, the processes of the aforementioned steps 4 to 12 are repeatedly performed.

In the first exemplary illustrative embodiment, the cue ball is caused to move linearly according to the change in linear input. In another configuration, the display of the cue ball may be changed by calculating such conditions, for example, that by making a change in input to the touch panel 13 such that small curls are drawn along a straight line, the cue ball is shot in a direction in which the line is drawn, and the spin direction of the cue ball changes depending on how the curls are drawn.

As described in the first exemplary illustrative embodiment, the cue ball P1 on the first display screen 11a moves according to the change in the input to the graphic to be controlled, i.e., according to the input pattern provided to the touch panel 13, whereby it is possible to provide a game which gives the player an unprecedented sense of control.

SECOND EMBODIMENT

Figure 7:
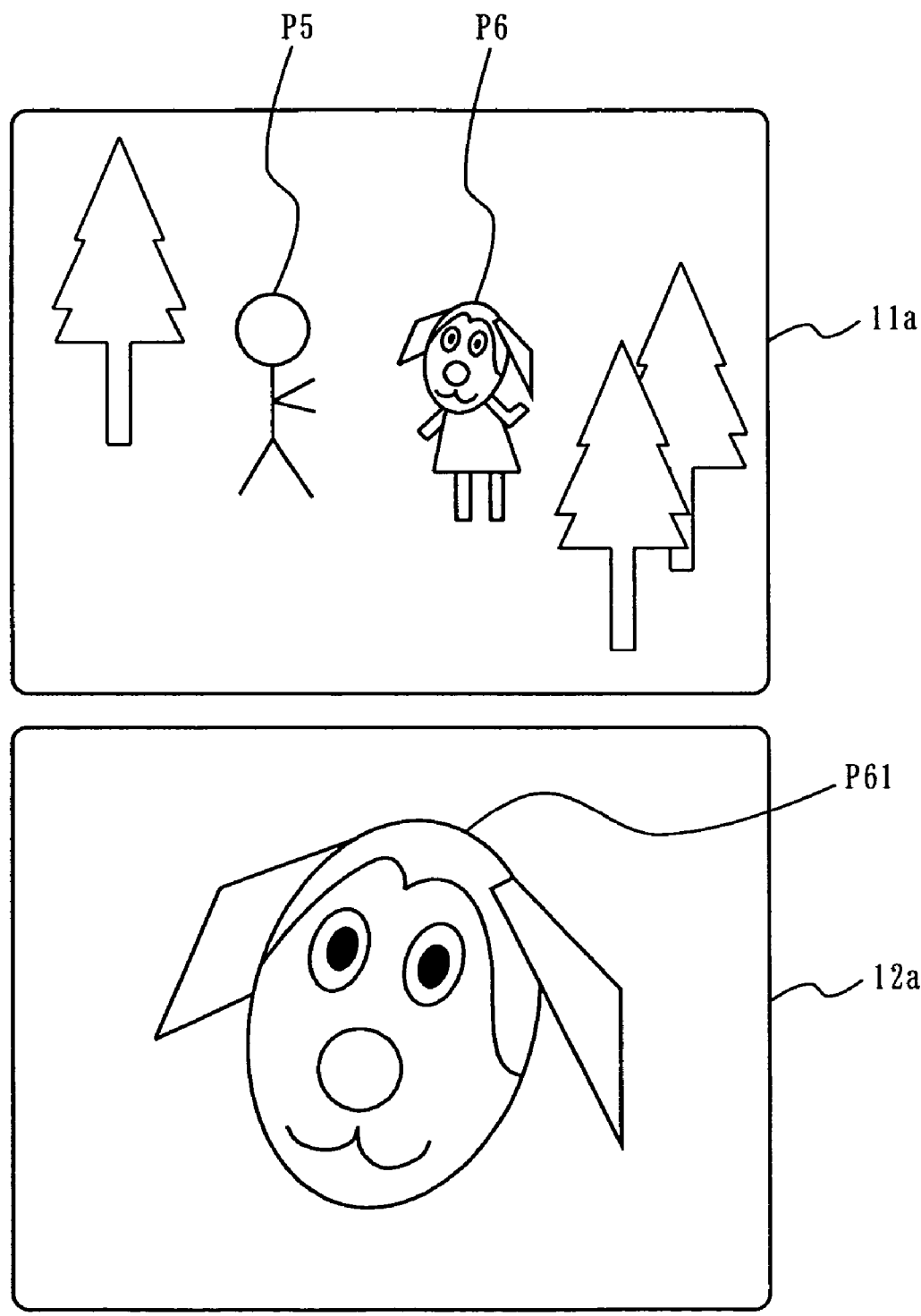
FIG. 7 is a diagram illustrating exemplary screens showing game images of a second embodiment of the present invention.
Figure 8:
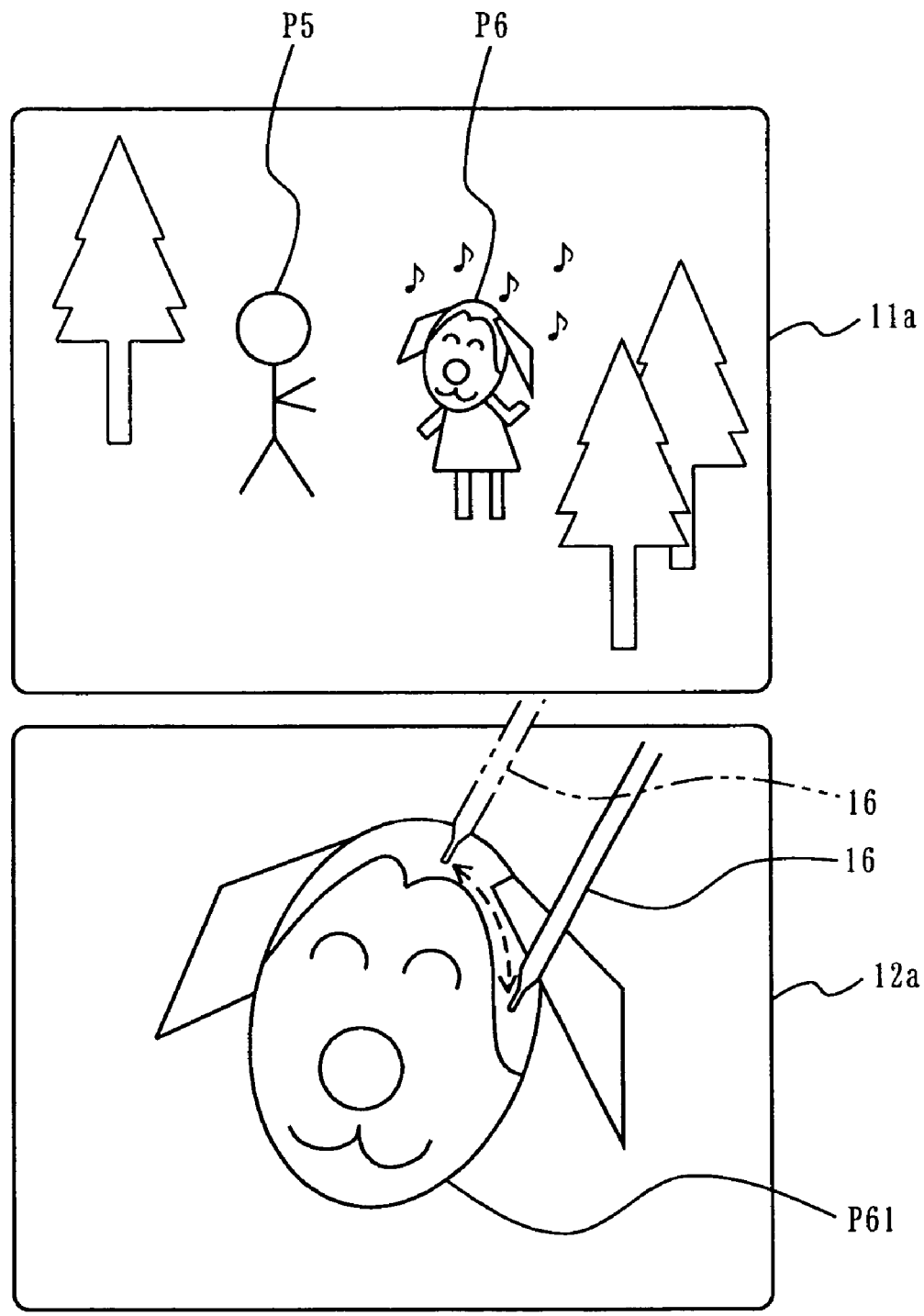
FIG. 8 is a diagram illustrating first exemplary screens showing a change in the game image according to the change in input to a touch panel in the second embodiment.
Figure 9:
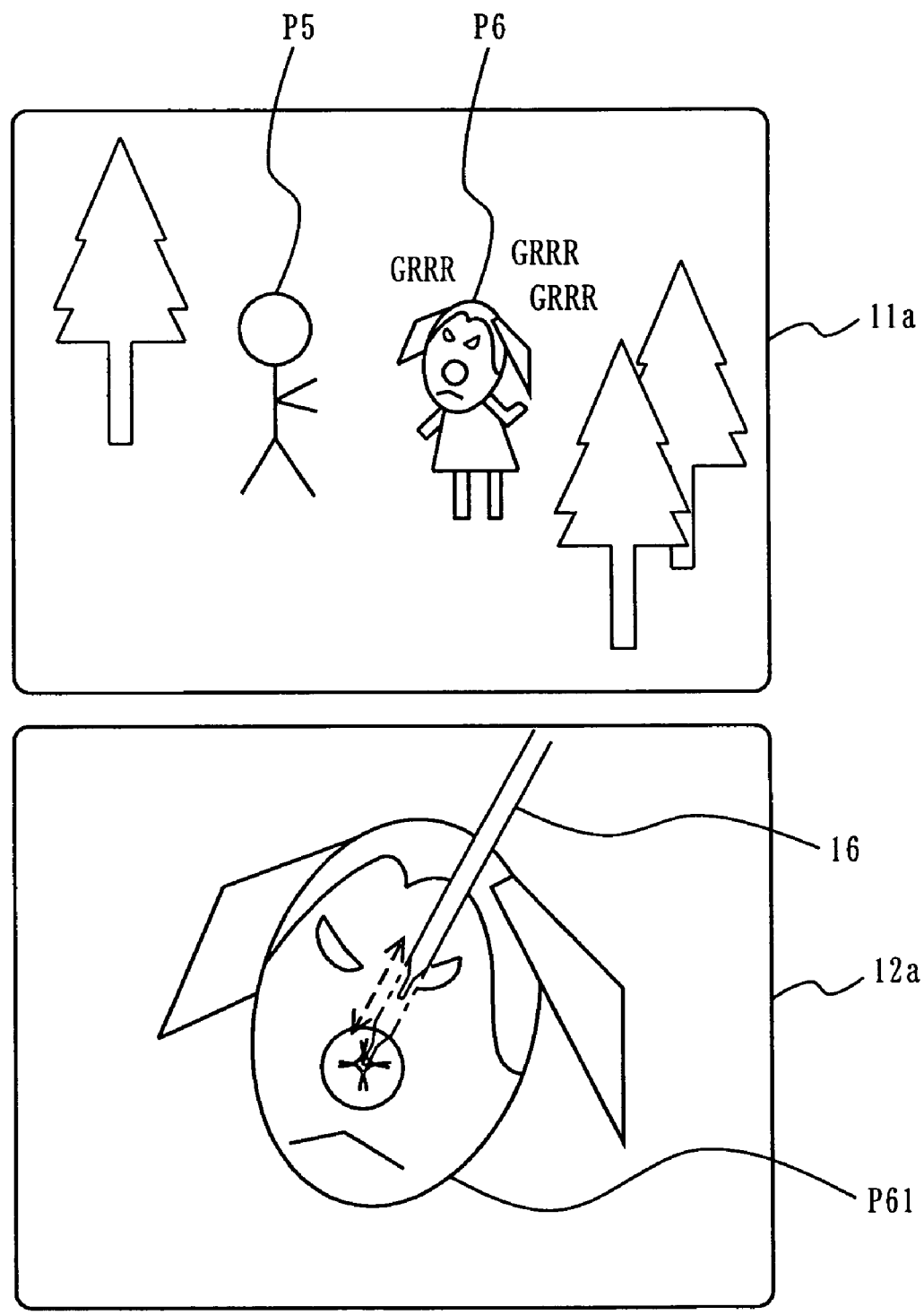
FIG. 9 is a diagram illustrating second exemplary screens showing a change in the game image according to the change in input to the touch panel in the second embodiment.

The game to be executed based on a game program according to a second exemplary illustrative embodiment will be described below. The second exemplary illustrative embodiment describes the case where the display of a player character P6 on the first display screen 11a is changed by selecting, based on an input pattern which represents the change in input provided to a character pattern P61 through the touch panel 13, a ready-made input pattern (which is prepared in the game program in advance) close to the input pattern, and then changing emotional parameters according to the ready-made input pattern. Before describing the detailed flow of the game program, to facilitate the understanding of the present invention, an overview of the exemplary illustrative embodiment will be provided with reference to FIGS. 7 to 9. FIG. 7 is a diagram illustrating exemplary screens initially displayed when the game has been started by the game program of the exemplary illustrative embodiment. FIG. 8 is a diagram illustrating exemplary screens displayed when a change in input is made to a character pattern on the second display screen 12a. FIG. 9 is a diagram illustrating exemplary screens displayed when another change in the input is made to the character pattern. Note that the same description as that of the first exemplary illustrative embodiment is omitted.

First, as shown in FIG. 7, a game image showing a wide range of a game space is displayed on the display screen 11a of the game machine 1. A character pattern showing the face portion of a player character contained in the game image is displayed on the second display screen 12a. Specifically, the game image shows a 3D game space containing two player characters P5 and P6 which are controllable by the player, as viewed from a given viewpoint. The player character P5 can be controlled using the control keys 14 provided to the game machine 1. The player character P6, on the other hand, can be controlled only by providing input to the touch panel 13.

In this game, the player character P5 moves within the game space by the player controlling the control keys 14, for example. As a result of the player character P5 wandering around the game space, the player character P5 meets the player character P6. Upon this event, the character pattern P61 showing the face portion of the player character P6 is displayed on the second display screen 12a. The display of the game machine 1 at this stage is shown in FIG. 7.

As shown in FIG. 8, the player provides input to the character pattern P6 so as to pat the character pattern P6 on the head, using a stylus 16. By this, the game machine 1 determines from the change in input to the character pattern P61 (i.e., from an input pattern) that the head is patted and then changes the display of the player character P6 on the first display screen 11a from a normal state to a happy state.

On the other hand, as shown in FIG. 9, if the nose portion of the character pattern 61 is tapped (such as a tapping input or an operation such as a double-click) a plurality of times with the stylus 16, the display of the player character P6 on the first display screen 11a changes to an angry state.

Figure 10:
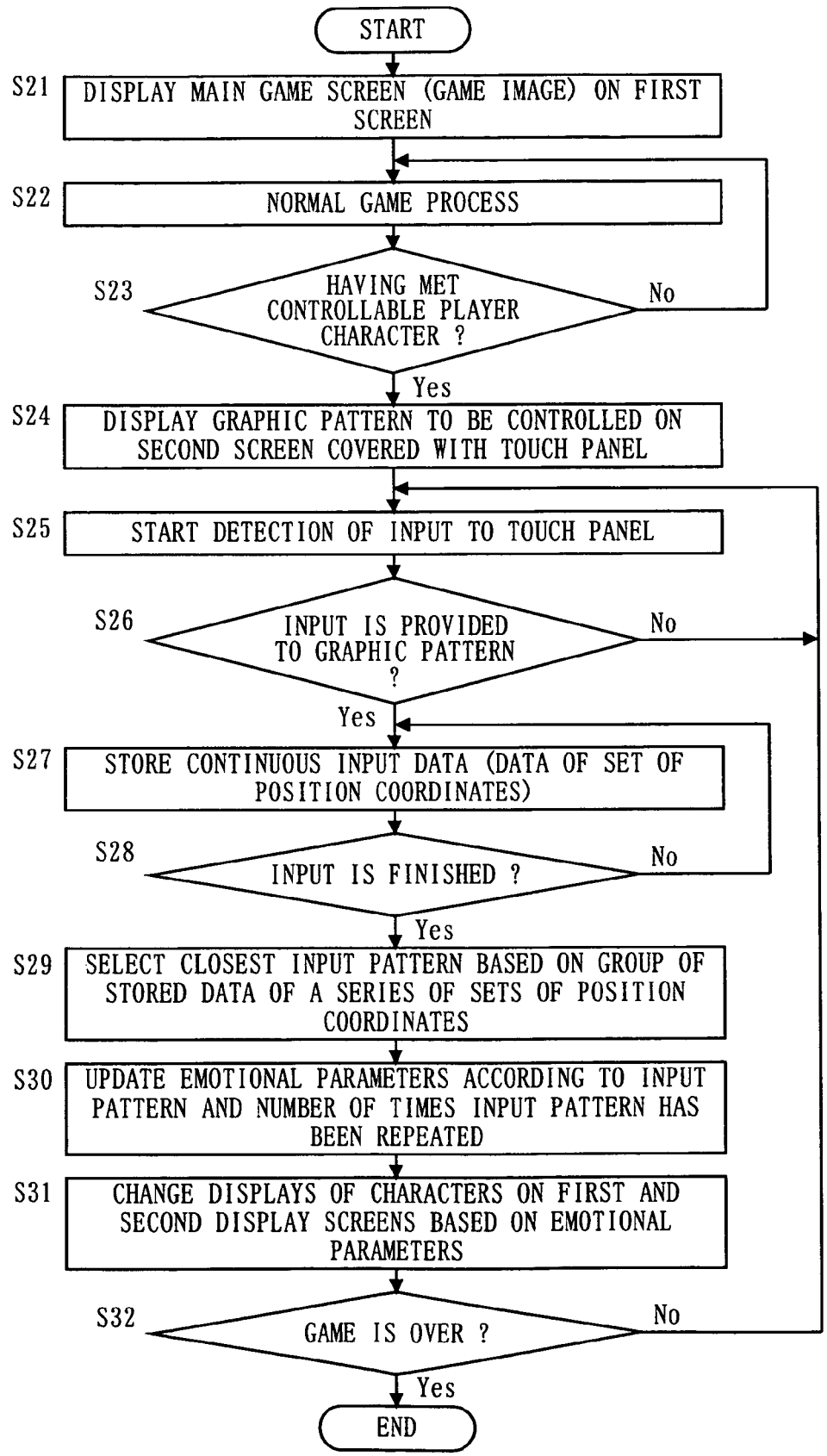
FIG. 10 is a main flowchart showing game processing performed by a game machine of the second embodiment.

Now, the processing performed by the game program will be described in detail with reference to the flow in FIG. 10. First, after the power of the game machine 1 is turned on, a game image is displayed on the first display screen 11a. Then, in step 21, as a game image, a game space containing a player character P5 is displayed on the first display screen 11a, as viewed from a given viewpoint. In the subsequent step 22, as with a normal game process, the player character P5 is caused to move within the game space using the control keys 14 of the player. In step 23, until the player character P5 meets the player character P6, the process of step 22 is repeated. Note that the player character P6 is assigned with emotional parameters such as a happy parameter and an angry parameter, and the action of the player character P6 is controlled by an AI program and according to the emotional parameters. For example, the action may be controlled such that by making the player character P6 happy through input to the touch panel 13 from the player, the player character P6 may be able to receive special items, or by making the player character P6 angry, the player character P6 may fight with the player character P5.

In the subsequent step 24, if the player character P5 meets the player character P6, a character pattern P61 showing the face portion of the player character P6 and associated with the player character P6 is displayed on the second display screen 12a. The character pattern P61 is the graphic to be controlled.

In the subsequent step 25, the detection of input to the touch panel 13 starts. In step 26, a set of position coordinates on the touch panel 13 which is the first one to be detected (i.e., a set of position coordinates of the start point) is compared with a coordinate region where the character pattern P61 is displayed, so as to determine whether the first detection position is located in the character pattern P61. In step 26, until input to the character pattern P61 is detected, step 25 is repeatedly performed. If input to the character pattern P61 is detected, the subsequent step 27 is performed. By these steps 25 and 26, it is determined that input is provided to the graphic displayed on the second display screen 12a.

In steps 27 and 28, while a change in the input, (i.e., the input) is continued, data of sets of consecutive position coordinates of the input are stored in the WRAM 22. In step 28, if it is determined that the continuous input is finished, for example, if input is not provided within a predetermined amount of time, the subsequent step 29 is performed. That is, even if the input is intermittent, if the interval is shorter than the predetermined amount of time, the input is determined as a substantially continuous input.

In step 29, based on a group of data of sets of a series of consecutive position coordinates stored in the WRAM 22, an input pattern closest to the group of data group is selected from among a plurality of input patterns prepared in advance. Specifically, as shown in FIG. 11, a plurality of types of input patterns are stored or contained in the WRAM 22 and the game program. The input patterns have their respective attributes. In step 29, an input pattern with the greatest number of matching attributes to the group of data of sets of position coordinates is selected. A first input pattern shown in FIG. 11 has attributes as follows: for example, the change in the input is continuous (i.e., data of adjacent position coordinates is continued); the input location is around the head portion of the character pattern P61; and the input range is linearly distributed in a long and thin manner. The first input pattern represents the change in the input of "pat" such as that shown in FIG. 8. A second input pattern has attributes as follows: the change in the input is intermittent (i.e., the input itself is sporadic or discontinuous); the input location is a region around the nose of the character pattern P61; and the input range is distributed in a dot-like pattern. The second input pattern represents the change in the input of "tap" such as that shown in FIG. 9.

In step 30, an emotional parameter corresponding to a selected input pattern is increased or decreased based on the number of times the input pattern has been repeated, or the like, and then is updated. Specifically, for example, in the case where the first input pattern is selected, based on the group of data of sets of position coordinates, a calculation is performed to determined how many times the first input pattern has been repeated. Then, since, in the case of the first input pattern, among the emotional parameters, the "happy" parameter is increased, the "happy" parameter is increased based on the number of times the first input pattern has been repeated. On the other hand, in the case where the second input pattern is selected, a calculation is performed to determine how many times the second input pattern has been repeated, and the "angry" parameter is increased based on the calculated number of times.

In the subsequent step 31, the display of the player character P6 on the first display screen 11a is changed according to the emotional parameters, along with the display of the character pattern P61 on the second display screen 12a. For example, if the "happy" parameter is increased, the displays are updated such that the player character P6 and the character pattern P61 show the facial expression of happiness. On the other hand, if the "angry" parameter is increased, the displays are updated such that the player character P6 and the character pattern P61 show the facial expression of anger.

In the last step 32, until there is an instruction from the player to finish the game, the aforementioned steps 25 to 31 are repeatedly performed. Note that the second exemplary illustrative embodiment does not describe this, but it is also possible to change the course of the game such that clues in the course of the game, items, or the like are provided to the player character P6 by making the player character P6 happy or angry.

According to the second exemplary illustrative embodiment, an input pattern close to the change in the input to the graphic is selected from among a plurality of types of input patterns prepared in advance, and the emotional parameters assigned to a player character are changed according to the selected input pattern, whereby the display of the player character is changed. Accordingly, a game can be provided which gives the player an unprecedented sensation such that the display of the player character is changed by relatively flexible input control by the player.

THIRD EMBODIMENT

Figure 12:
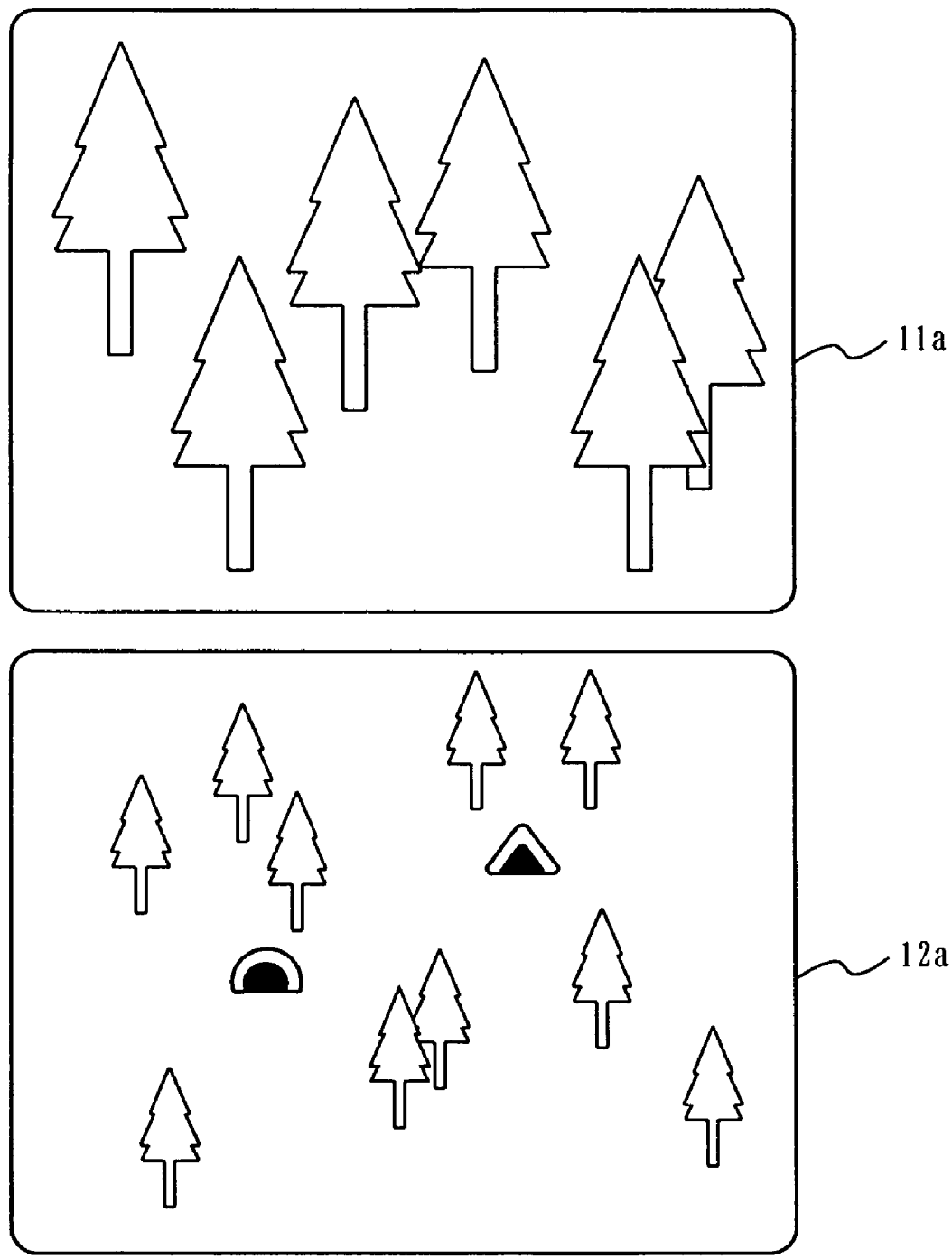
FIG. 12 is a diagram illustrating exemplary screens showing game images of a third embodiment of the present invention.
Figure 13:
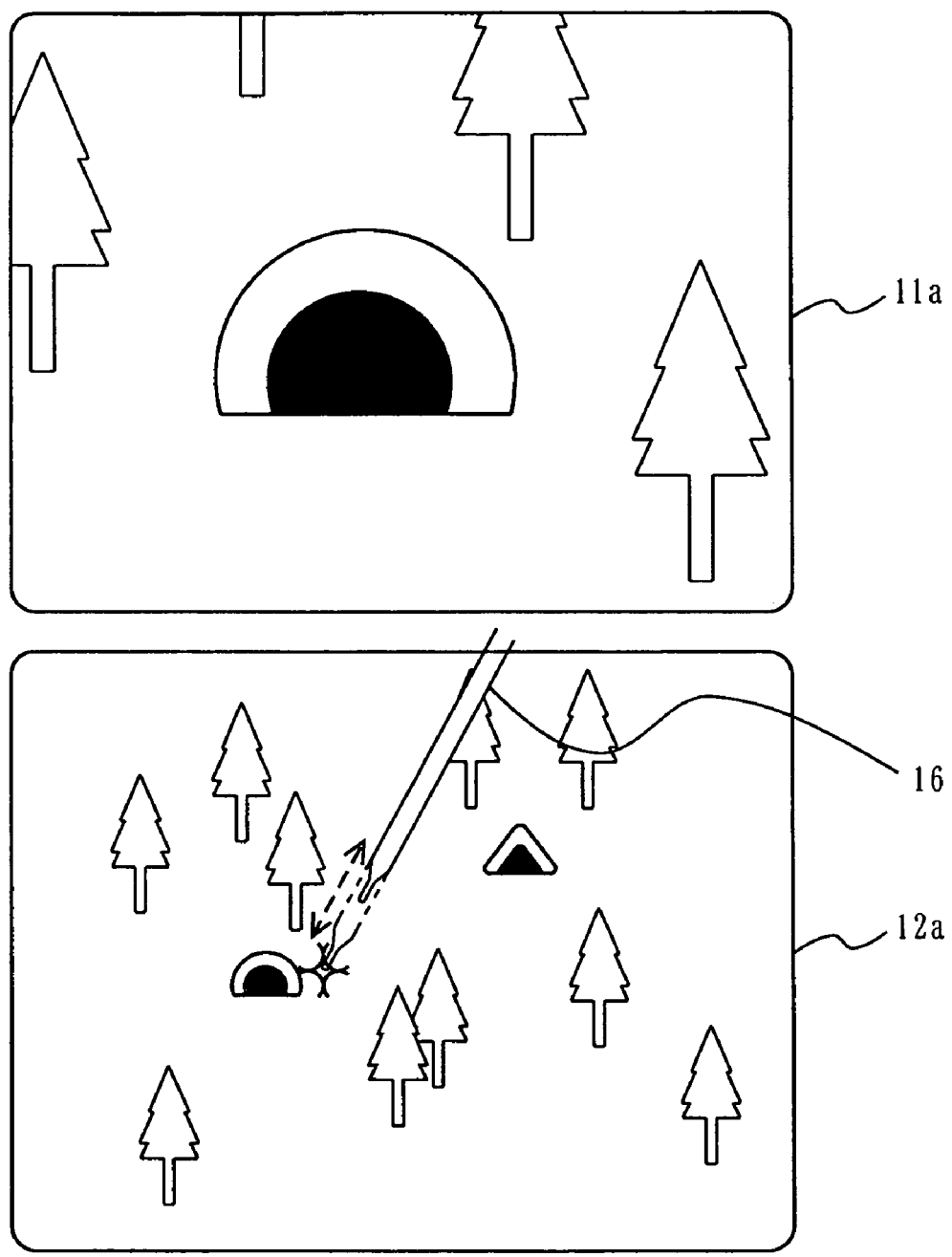
FIG. 13 is a diagram illustrating first exemplary screens showing a change in the game image according to the change in input to a touch panel in the third embodiment.

The game to be executed based on a game program according to a third exemplary illustrative embodiment will be described below. The third exemplary illustrative embodiment describes the case where when the change in input of a first input pattern is made to the touch panel 13, a game image on the first display screen 11a is changed; and when the change in input of a second input pattern is made, a game image on the second display screen 12a is changed. Before describing the detailed flow of the game program, to facilitate the understanding of the exemplary illustrative embodiment, an overview of the exemplary illustrative embodiment will be provided with reference to FIGS. 12 to 14. FIG. 12 is a diagram illustrating exemplary screens showing game images displayed on the first display screen 11a and the second display screen 12a by the game program of the exemplary illustrative embodiment. FIG. 13 is a diagram illustrating an exemplary screen showing the game image on the first display screen which changes according to the change in input to the second display screen 12a.

First, as shown in FIG. 12, on the first display screen 11a, as a game image, a narrow range (a first display range) on a map, which is an image of a game space as viewed from the upper viewpoint, is displayed at an enlarged scale. A map contained in the narrow range is called a "narrow-area map". On the second display screen 12a, as a game image, a wide range (a second display range) on the map, which is an image of the game space as viewed from the upper viewpoint, is displayed. A map contained in the wide range is called a "wide-area map", and the wide-area map is wider than the narrow-area map and is a region narrower than the entire map. The player proceeds with the game using the maps displayed on the two screens while changing the display of either the wide-area map or the narrow-area map by making a change in the input to the touch panel 13 (i.e., to the wide-area map displayed on the second display screen 12a).

As shown in FIG. 13, by tapping (a double-click or double-tap) any desired point in the wide-area map on the second display screen 12a several times with a stylus 16, a narrow-area map is displayed on the first display screen 11a with the tapped point being at the center of the screen. In this manner, the player can proceed with the game while observing the narrow-area map which shows a desired point in the wide-area map at an enlarged scale.

Figure 14:
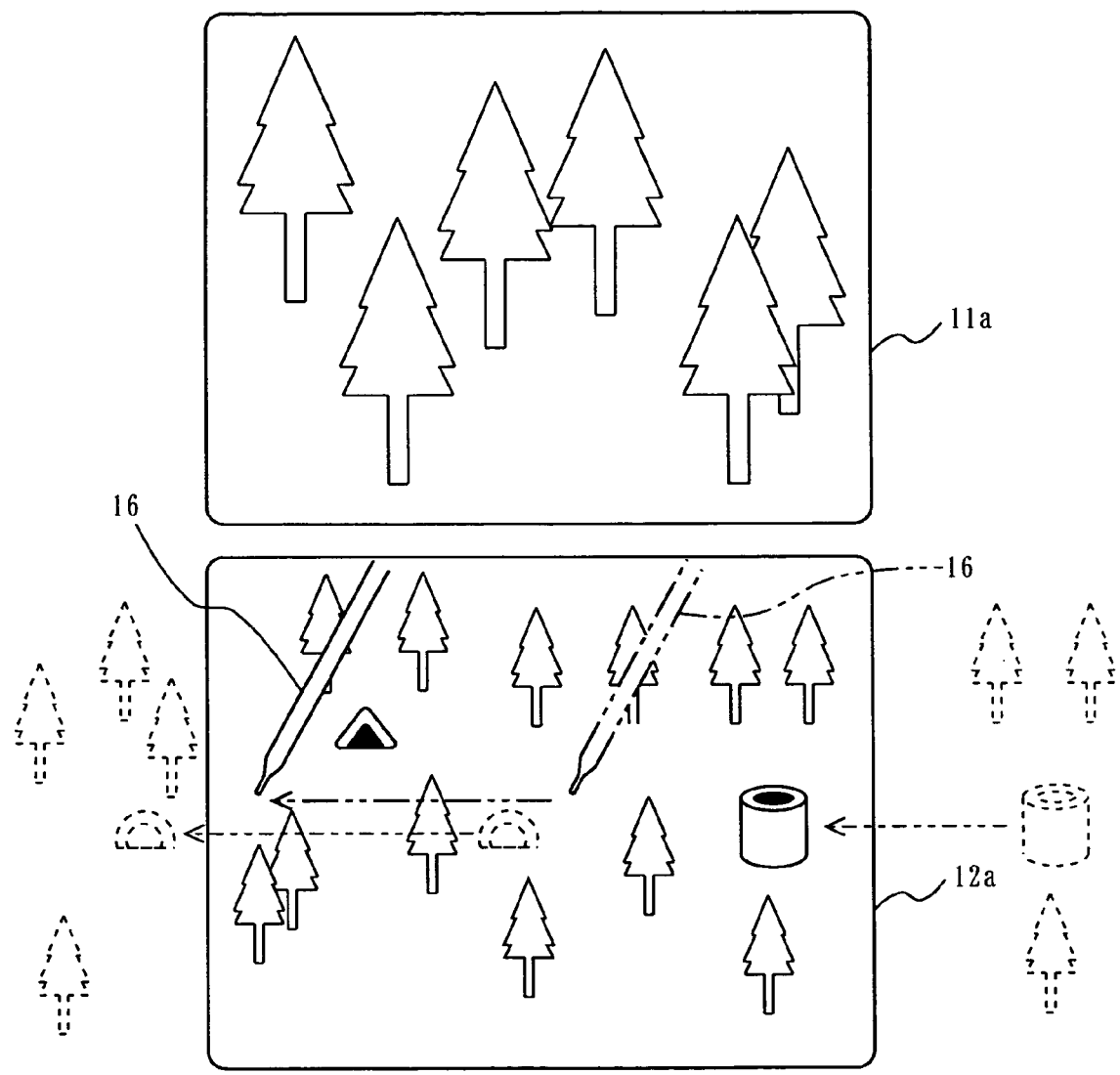
FIG. 14 is a diagram illustrating second exemplary screens showing a change in the game image according to the change in input to the touch panel in the third embodiment.

Further, as shown in FIG. 14, by dragging the wide-area map on the second display screen 12a in a desired direction with the stylus 16, the wide-area map is scrolled in the dragged direction and displayed. In this manner, the player can proceed with the game while roughly observing the map by scrolling the wide-area map, to search a desired point.

Figure 15:
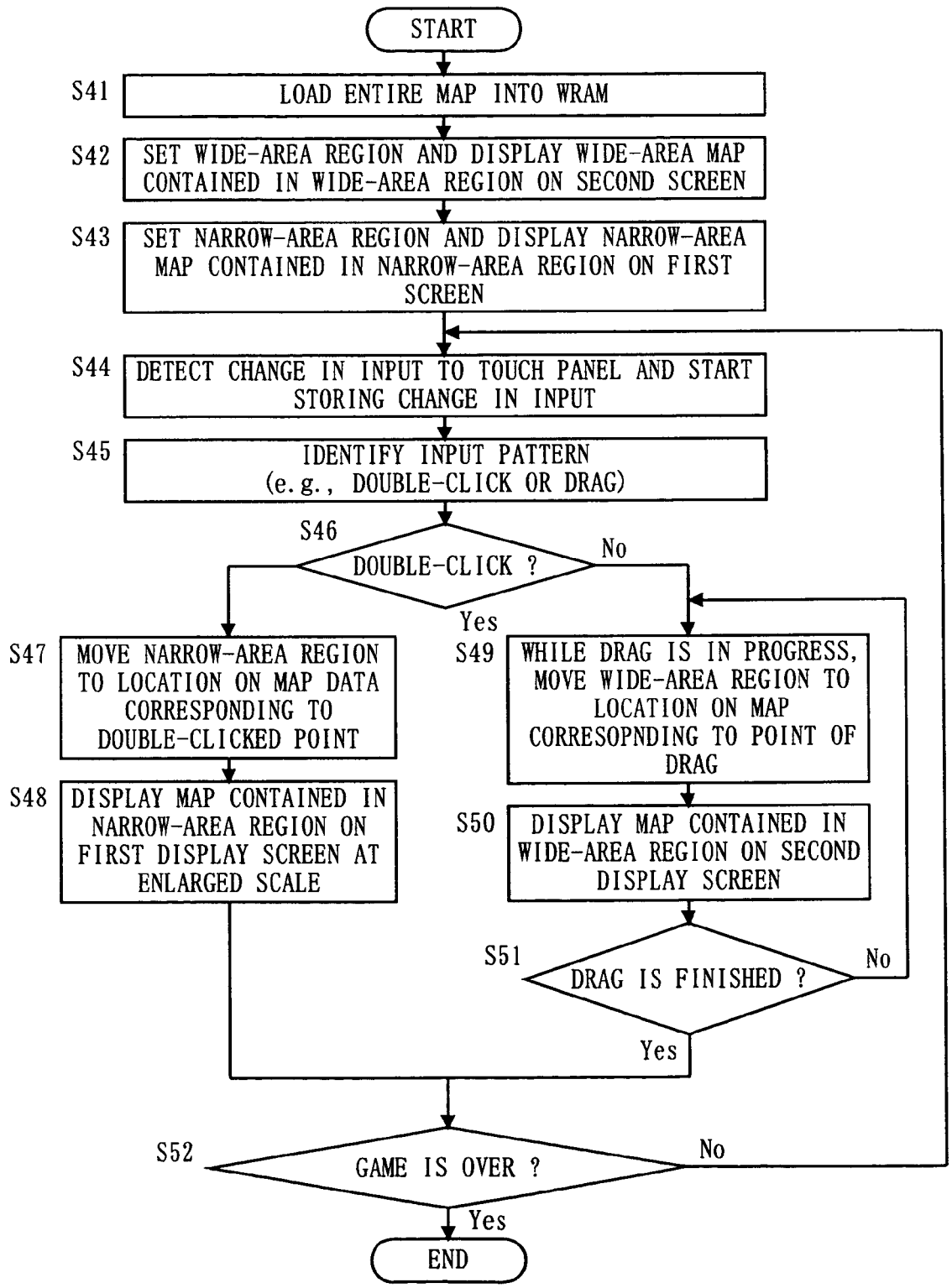
FIG. 15 is a main flowchart showing game processing performed by a game machine of the third embodiment.
Figure 17:
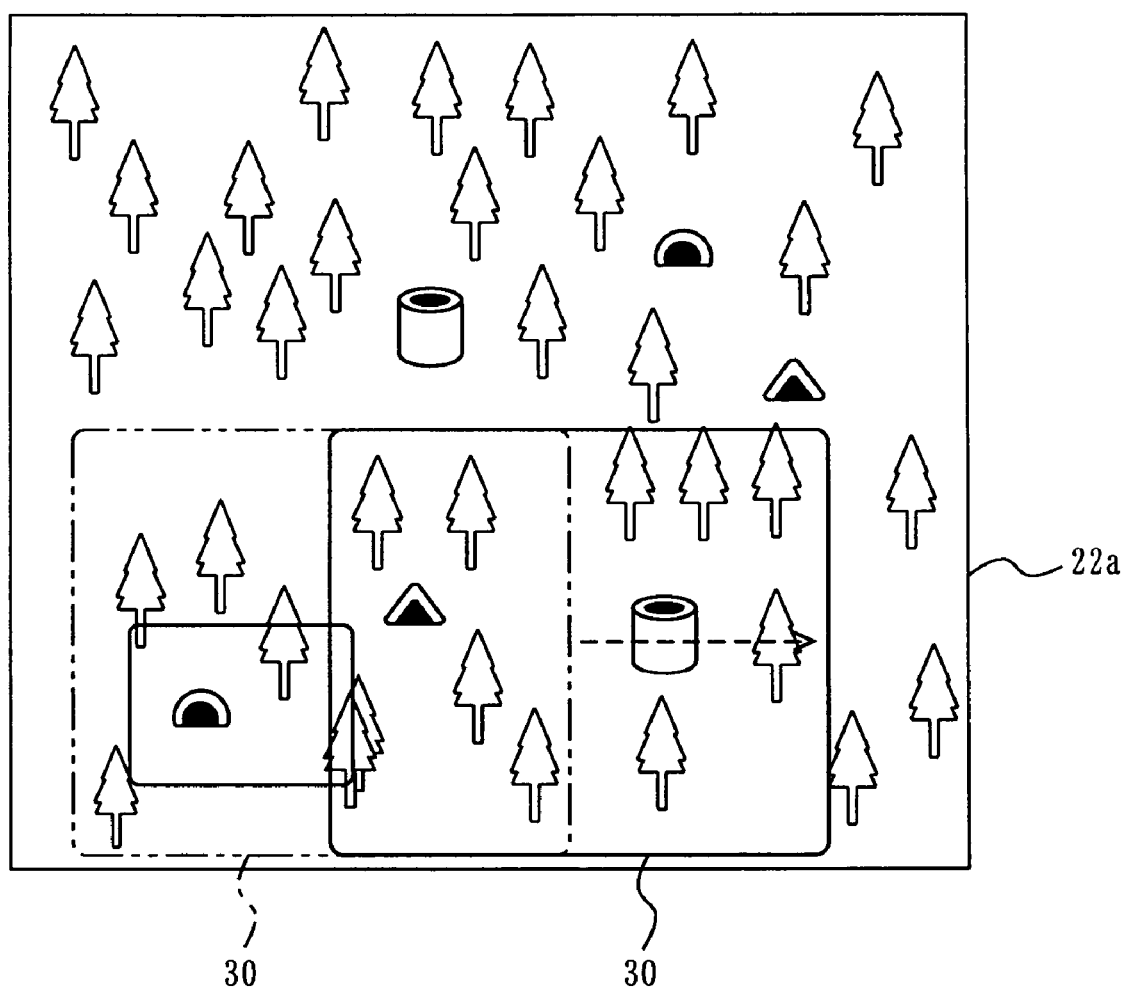
FIG. 17 is an illustrative diagram showing a second change in the map in the entire map in the third embodiment.

Now, the processing performed by the game program will be described in detail with reference to the flow in FIG. 15 and conceptual diagrams in FIGS. 16A, 16B, and 17 showing image data stored in the memory. FIG. 15 is a flow performed by a computer of the game machine 1 by the game program. FIGS. 16A, 16B, and 17 are conceptual diagrams showing the entire map expanded in an image storage region 22a which is part of the WRAM 22.

First, in step 41, when the power of the game machine 1 is turned on, image data of the entire map along with a game program are loaded into the WRAM 22, and the image is expanded in an image storage region 22a which is part of the WRAM 22. A conceptual diagram showing the entire map expanded in the image storage region 22a is shown in FIG. 16A. In step 42, a wide-area map region 30 used to display a wide-area map is set on the entire map in the image storage region 22a, and a map contained in the wide-area map region 30 is rendered in the second VRAM 24a, as a wide-area map, and then an image of the wide-area map is outputted, for display, to the second display screen 12a, as a game image. In step 43, a narrow-area map region 31 used to display a narrow-area map is set on the entire map in the image storage region 22a, and a map contained in the narrow-area map region 31 is rendered in the first VRAM 23a, and then an image of the narrow-area map is outputted, for display, to the first display screen 11a at an enlarged scale, as a game image. By these steps, the narrow-area map and the wide-area map are displayed on the first display screen 11a and the second display screen 12a, respectively. Note that the narrow-area map which is a map with a smaller range than the wide-area map, is displayed on the first display screen 11a of the same size as the second display screen 12a on which the wide-area map is displayed; as a result, the narrow-area map is outputted, for display, at an enlarged scale.

In the subsequent step 44, the detection and storing of a change in the input to the touch panel 13 start. Specifically, in this step, by continuously detecting and storing data of a set of position coordinates which is detected at predetermined time intervals, it is determined whether the input is continuous, and data of sets of position coordinates obtained while there is a substantially continuous input, are stored. The expression "substantially continuous" indicates that an intermittent input whose interval is equal to or shorter than a predetermined amount of time is determined as a series of consecutive input operations. Once the detection and storing in the present step have started, the subsequent step 45 is performed.

In step 45, an input pattern corresponding to the stored change in the input is identified. Specifically, the closest input pattern is searched for from pre-stored input patterns. For example, the present exemplary illustrative embodiment describes the case of identifying two types of input patterns, a double-click and a drag, and in the present step it is identified whether the change in the input is a double-click or a drag. In the subsequent step 46, if the identified change in the input is a double-click, steps 47 and 48 are performed. If it is not a double-click (i.e., it is a drag) steps 49 and 50 are performed.

If, in step 46, it is determined to be a double-click, a step 47 is performed. In step 47, as shown in FIG. 16B, a location within the image storage region 22a, which corresponds to a set of position coordinates of the double-clicked point, is located, and a narrow-area map region 31 is moved with the location being at the center of the screen. Then, in step 48, a map contained in the narrow-area map region 31 currently selected is rendered in the first VRAM 23a, and the narrow-area map is outputted, for display, to the first display screen 11a at an enlarged scale.

On the other hand, if, in step 46, it is determined to be not a double-click (i.e., it is determined to be a drag) step 49 is performed. In step 49, the increase or decrease in the number of coordinate points between sets of consecutive position coordinates caused by the drag and stored at predetermined time intervals is calculated, and then the wide-area map region 30 in the image storage region 22a is moved in the direction opposite to the movement direction of the drag and to an extent equal to the calculated number of coordinate points. Specifically, as shown in FIG. 17, the wide-area map region 30 is moved in the direction opposite to the dragged direction and an amount of movement which is the same as the amount of movement of the drag. In step 50, a map contained in the wide-area map region 30 in the image storage region 22a is rendered in the second VRAM 24a, and the wide-area map is outputted, for display, to the second display screen 12a. In the subsequent step 51, while the change in the input is continuously detected in step 44, steps 49 and 50 are repeatedly performed. In this manner, while a drag is in progress on the second display screen 12a, the wide-area map is scrolled and displayed.

In the last step, step 52, until there is an instruction from the player to finish the game, the aforementioned steps 44 to 51 are repeatedly performed. Note that the third exemplary illustrative embodiment does not particularly describe this, but it is also possible to change the magnification of an enlarged display such that the range of the narrow-area map region 31 is reduced or increased according to the change in the input, other than a drag and a double-click, for example, the number of clicks; or to acceleratingly increase or reduce the scrolling speed of a map having an enlarged scale according to the speed of the drag. Alternatively, the two screens may be simultaneously changed, depending on the input pattern based on a specific change in the input.

According to the third exemplary illustrative embodiment, a game image on at least either the first display screen 11a or the second display screen 12a is changed according to the input pattern corresponding to the change in the input to the touch panel 13, whereby it is possible to provide a game which allows the player to proceeds with the game by fully using the two screens.

Figure 18:
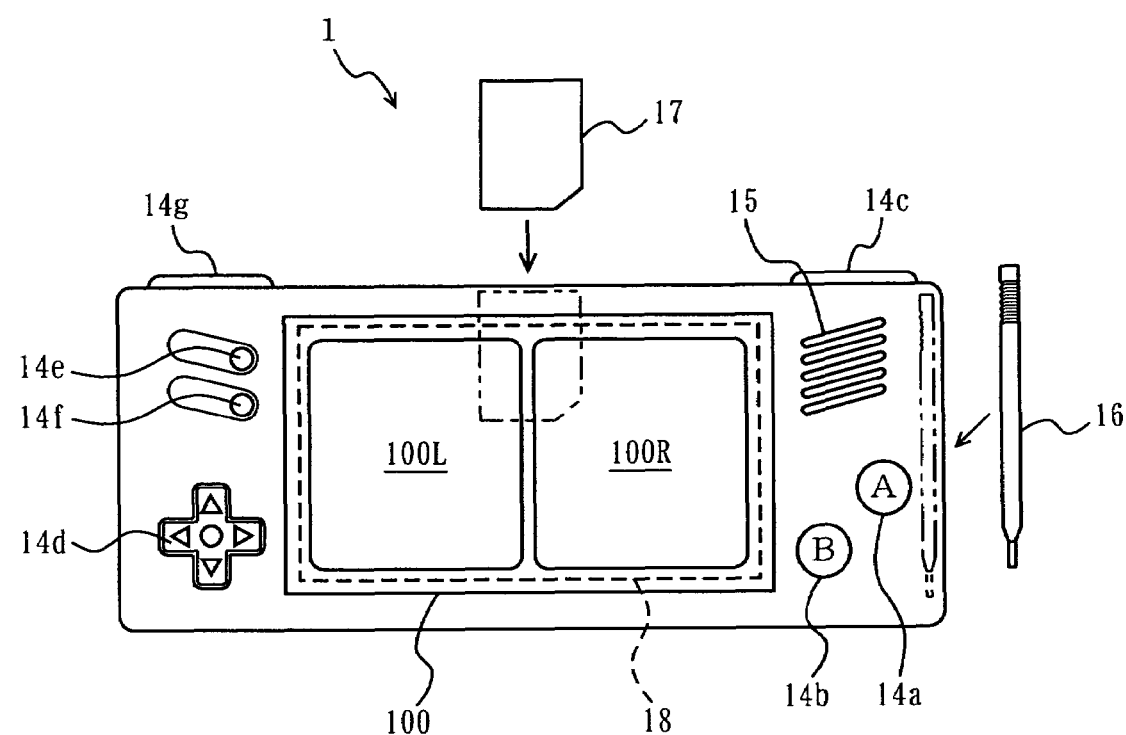
FIG. 18 is an exemplary illustrative schematic view exemplifying another configuration of the game machine.

As shown in FIG. 1, all the aforementioned exemplary illustrative embodiments describe the game machine 1 having two physical display devices, the first LCD 11 with the first display screen 11a and the second LCD 12 with the second display screen 12a; however, the exemplary illustrative embodiment is not limited to game programs executed by such a game machine 1. It is also possible to use a game machine with a single physical display device, a display screen of which is divided into two screens. Such a game machine with a single display device is shown in FIG. 18. Note that the same components as those described in the aforementioned exemplary illustrative embodiments are designated by the same reference numerals, and the description thereof will be omitted.

As shown in FIG. 18, a game machine 1 has a single LCD device 100 instead of the aforementioned first LCD 11 and second LCD 12. The entire screen of the display device 100 is covered with a touch panel 18. The screen is divided into at least two display screens, a first display screen 100L and a second display screen 100R, by a game program or a monitor program. A computer of the game machine 1 detects a change in input to a region of the touch panel 13 corresponding to the second display screen 100R, and to a graphic displayed on the second display screen 100R, and the same processing as the aforementioned three exemplary illustrative embodiments is performed. By this, a game image, etc., on either the first display screen 100L or the second display screen 100R is changed. By the variant exemplary illustrative embodiment, the games according to the present invention can be provided to conventional game machines having a display device with a touch panel.

The aforementioned exemplary illustrative embodiments describe the example case where the change in display, such as movement of the first player character or a display of a narrow-area map, is caused according to the change in the input to the second display screen. In another configuration, for example, the shape or color of the player character itself on the first display screen may be changed according to the change in the input, or the displayed scene may be changed to jump to another scene in the game space according to the change in the input.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage medium having stored therein a game program to be executed by a computer of a game machine having a first display screen and a second display screen covered with a touch panel, the game program causing the computer to function as:

a game image display controller for displaying a game image on the first display screen;

a graphic display controller for displaying on the second display screen a graphic related to the game image;

an input coordinate detector for detecting a plurality of input coordinates, based on a change in sequential inputs to the touch panel;

a parameter determining programmed logic circuitry for determining, if the input detected by the input coordinate detector is provided to the graphic, at least two types of calculation parameters in accordance with the plurality of input coordinates including at least some previously inputted coordinates, at a time after completion of the sequential inputs to the touch panel;

a change condition calculator for calculating, based on the calculation parameters, change condition setting data used to change the game image according to the change in the inputs; and an image change controller for changing the game image on the first display screen based on the change condition setting data.

2. The storage medium according to claim 1, wherein the game image display controller displays on the first display screen a game image containing a player character, a display of the player character changing in response to the input from a player, the graphic display controller displays a character pattern associated with the player character;

the change condition calculator calculates change condition setting data used to change the display of the player character according to a change in the input to the character pattern, and the image change controller changes the display of the player character in the game image based on the change condition setting data.

3. The storage medium according to claim 2, wherein the input coordinate detector detects the plurality of the input coordinates by determining at predetermined time intervals whether sequential inputs are provided to the touch panel, and then detecting sets of position coordinates on the touch panel obtained while the sequential inputs are continuously detected, the parameter determining programmed logic circuitry determines, as calculation parameters, sets of position coordinates of an input start point and an input end point with respect to the touch panel, the change condition calculator calculates, based on the calculation parameters, change condition setting data used to move the player character according to a positional relationship between the input start point and the input end point, and the image change controller moves the player character based on the change condition setting data.

4. The storage medium according to claim 2, wherein the input coordinate detector detects the plurality of input coordinates by determining at predetermined time intervals whether sequential inputs are provided to the touch panel, and then detecting sets of position coordinates on the touch panel obtained while the sequential inputs are continuously detected, the parameter determining programmed logic circuitry determines, as calculation parameters, sets of position coordinates of an input start point and an input end point with respect to the touch panel, the change condition calculator calculates, based on the calculation parameters, change condition setting data used to move the player character according to a positional relationship between the input start point or the input end point and a reference position of the character pattern, and the image change controller moves the player character based on the change condition setting data.

5. The storage medium according to claim 1, wherein the game program causes the computer to further function as timekeeper for measuring an input detection time while the sequential inputs to the touch panel is continuously detected, the parameter determining programmed logic circuitry determines at least two types of calculation parameters including the input detection time, and the change condition calculator calculates, based on the calculation parameters, change condition setting data used to reflect the input detection time in movement of a player character.

6. A storage medium having stored therein a game program to be executed by a computer of a game machine having a first display screen and a second display screen covered with a touch panel, the game program causing the computer to function as:

a game image display controller for displaying on the first display screen a game image containing a player character, a display of the player character changing in response to input from a player;

a graphic display controller for displaying on the second display screen a character pattern associated with the player character;

an input change detector for detecting a change in the input by detecting, at predetermined time intervals, the input provided to the touch panel and then detecting sets of position coordinates on the touch panel obtained while the change in the input is detected;

an input pattern extractor for extracting, if the input detected by the input change detector is provided to the character pattern, an input pattern closest to the change in the input from a group of input patterns prepared in advance;

an emotional parameter changer for changing emotional parameters assigned to the player character, according to a type of the input pattern and the number of times the input pattern has been repeated which are extracted by the input pattern extractor, the emotional parameters being stored; and an image change controller for changing a display of the player character based on the emotional parameters having been changed by the emotional parameter changer.

7. A storage medium having stored therein a game program to be executed by a computer of a game machine having a first display screen and a second display screen covered with a touch panel, the game program causing the computer to function as:

a narrow-area map display controller for setting, within an image storage region where a game space is rendered, a first display range used to display part of the rendered game space, and displaying, as a narrow-area map, an image contained in the first display range on the first display screen at an enlarged scale;

a wide-area map display controller for setting, within the image storage region, a second display range wider than the first display range, and displaying an image contained in the second display range on the second display screen, as a wide-area map;

an input pattern detector for detecting an input pattern provided to a region of the touch panel where the wide-area map is displayed, and an input position of the input pattern; and a narrow-area map updater for updating, if the input pattern detected by the input pattern detector is determined as a first input pattern, a display of the narrow-area map by moving the first display range to a location within the image storage region which corresponds to the input position, and then displaying an image contained in the first display range on the first display screen at an enlarged scale.

8. The storage medium according to claim 7, wherein the game program causes the computer to further function as a wide-area map updater for updating, if the input pattern detected by the input pattern detector is determined as a second input pattern, the wide-area map by scrolling the second display range within the image storage region in conjunction with the input pattern, and then displaying an image contained in the second display range on the second display screen.

9. A method of displaying images from a game program to be executed by a computer of a game machine having a first display screen and a second display screen covered with a touch panel, the method comprising:

displaying a game image on the first display screen;

displaying on the second display screen a graphic related to the game image;

detecting a plurality of input coordinates, based on a change in sequential inputs to the touch panel;

determining, if a change in input is detected, at least two types of calculation parameters in accordance with the plurality of input coordinates including at least some previously inputted coordinates, at a time after completion of the sequential inputs to the touch panel;

calculating, based on the calculation parameters, change condition setting data used to change the game image according to the change in the input; and changing the game image on the first display screen based on the change condition setting data.

10. The method according to claim 9, further comprising:

displaying on the first display screen a game image containing a player character, a display of the player character changing in response to the input from a player, displaying a character pattern associated with the player character;

calculating change condition setting data used to change the display of the player character according to a change in the input to the character pattern, and changing the display of the player character in the game image based on the change condition setting data.

11. The method according to claim 10, further comprising:

detecting the plurality of input coordinates by determining at predetermined time intervals whether sequential inputs are provided to the touch panel, and then detecting sets of position coordinates on the touch panel obtained while the sequential inputs are continuously detected, determining, as calculation parameters, sets of position coordinates of an input start point and an input end point with respect to the touch panel, calculating, based on the calculation parameters, change condition setting data used to move the player character according to a positional relationship between the input start point and the input end point, and moving the player character based on the change condition setting data.

12. The method according to claim 11, further comprising:

detecting the plurality of input coordinates by determining at predetermined time intervals whether the sequential inputs are provided to the touch panel, and then detecting sets of position coordinates on the touch panel obtained while the sequential inputs are continuously detected, determining, as calculation parameters, sets of position coordinates of an input start point and an input end point with respect to the touch panel, calculating, based on the calculation parameters, change condition setting data used to move the player character according to a positional relationship between the input start point or the input end point and a reference position of the character pattern, and moving the player character based on the change condition setting data.

13. The method according to claim 9, further comprising:

measuring an input detection time while the sequential inputs to the touch panel is continuously detected, determining at least two types of calculation parameters including the input detection time, and calculating, based on the calculation parameters, change condition setting data used to reflect the input detection time in movement of a player character.

14. A method of displaying images from a game program to be executed by a computer of a game machine having a first display screen and a second display screen covered with a touch panel, the method comprising:

displaying on the first display screen a game image containing a player character, a display of the player character changing in response to input from a player;

displaying on the second display screen a character pattern associated with the player character;

detecting a change in the input by detecting, at predetermined time intervals, the input provided to the touch panel and then detecting sets of position coordinates on the touch panel obtained while the change in the input is detected;

extracting, if the detected input is provided to the character pattern, an input pattern closest to the change in the input from a group of input patterns prepared in advance;

changing emotional parameters assigned to the player character, according to a type of the input pattern and the number of times the input pattern has been repeated extracted by the extracting step, the emotional parameters being stored; and changing a display of the player character based on the emotional parameters having been changed by the emotional parameter changer.

15. A method of displaying images from a game program to be executed by a computer of a game machine having a first display screen and a second display screen covered with a touch panel, as the method comprising:

setting, within an image storage region where a game space is rendered, a first display range used to display part of the rendered game space, and displaying, as a narrow-area map, an image contained in the first display range on the first display screen at an enlarged scale;

setting, within the image storage region, a second display range wider than the first display range, and displaying an image contained in the second display range on the second display screen, as a wide-area map;

detecting an input pattern provided to a region of the touch panel where the wide-area map is displayed, and an input position of the input pattern; and updating, if the detected input pattern is determined as a first input pattern, a display of the narrow-area map by moving the first display range to a location within the image storage region which corresponds to the input position, and then displaying an image contained in the first display range on the first display screen at an enlarged scale.

16. The method according to claim 11, further comprising updating, if the detected input pattern is determined as a second input pattern, the wide-area map by scrolling the second display range within the image storage region in conjunction with the input pattern, and then displaying an image contained in the second display range on the second display screen.

* * * * *